US012690952B2

(12) United States Patent
Mottelson et al.

(10) Patent No.: US 12,690,952 B2
(45) Date of Patent: Jul. 28, 2026

(54) SYSTEMS AND METHODS FOR GENERATING A DIGITAL REPRESENTATION OF A 3D OBJECT

(71) Applicant: 3SHAPE A/S, Copenhagen (DK)

(72) Inventors: Isak Mottelson, Copenhagen (DK); Henrik Öjelund, Copenhagen (DK)

(73) Assignee: 3Shape A/S, Kobenhavn K (DK)

( * ) Notice: Subject to any disclaimer, the term of this patent is extended or adjusted under 35 U.S.C. 154(b) by 100 days.

(21) Appl. No.: 18/722,168

(22) PCT Filed: Dec. 19, 2022

(86) PCT No.: PCT/EP2022/086763
§ 371 (c)(1),
(2) Date: Jun. 20, 2024

(87) PCT Pub. No.: WO2023/117981
PCT Pub. Date: Jun. 29, 2023

(65) Prior Publication Data
US 2024/0398519 A1      Dec. 5, 2024

(30) Foreign Application Priority Data

Dec. 22, 2021      (EP) ..................................... 21217108
Jul. 8, 2022      (EP) .................................... 22183902

(51) Int. Cl.
*A61C 9/00*          (2006.01)
*A61C 13/34*          (2006.01)
(Continued)

(52) U.S. Cl.
CPC .............. *A61C 9/006* (2013.01); *A61C 13/34* (2013.01); *G06T 7/521* (2017.01); *G06T 7/55* (2017.01);
(Continued)

(58) Field of Classification Search
CPC .................................. A61C 9/006; G06T 7/55
See application file for complete search history.

(56) References Cited

U.S. PATENT DOCUMENTS 11,107,271 B2      8/2021  Ingram et al.
2007/0171220 A1*    7/2007  Kriveshko ................ G06T 7/30
                                                345/419
(Continued)

FOREIGN PATENT DOCUMENTS

EP          2177898 A1      4/2010

OTHER PUBLICATIONS

International Search Report (PCT/ISA/210) and Written Opinion (PCT/ISA/237) mailed on Mar. 27, 2023, by the European Patent Office as the International Searching Authority for International Application No. PCT/EP2022/086763, 15 pages.
(Continued)

*Primary Examiner* — Shivang I Patel
(74) *Attorney, Agent, or Firm* — BUCHANAN INGERSOLL & ROONEY PC

(57)          ABSTRACT

The present disclosure relates to a dental scanning system for generating a digital three-dimensional representation of a dental object, the system comprising an intraoral scanning device comprising one or more projector units configured to project a pattern on a surface of the dental object; and two or more cameras configured to acquire one or more sets of images; wherein the scanning system further comprises one or more processors configured to determine one or more image features within each set of images; solve a correspondence problem within each set of images such that points in 3D space are determined based on the image features, wherein said points form a solution to the correspondence problem, wherein the correspondence problem is solved for groups of pattern features; and generate a digital three-dimensional representation of the dental object, wherein the (Continued)

solution to the correspondence problem is used to generate the three-dimensional representation.

25 Claims, 14 Drawing Sheets

(51) Int. Cl.

| | | |
|---|---|---|
| *G06T 7/521* | (2017.01) | |
| *G06T 7/55* | (2017.01) | |
| *G06T 17/00* | (2006.01) | |

(52) U.S. Cl.
CPC .... *G06T 17/00* (2013.01); *G06T 2207/20081* (2013.01); *G06T 2207/20084* (2013.01); *G06T 2207/30036* (2013.01); *G06T 2210/41* (2013.01)

(56) References Cited

U.S. PATENT DOCUMENTS

| | | | |
|---|---|---|---|
| 2020/0292297 A1 | 9/2020 | Atala et al. | |
| 2020/0404243 A1* | 12/2020 | Saphier | A61C 9/0053 |
| 2021/0137653 A1 | 5/2021 | Saphier et al. | |

OTHER PUBLICATIONS

Zhang et al., "Rapid shape acquisition using color structured light and multi-pass dynamic programming", 3D Data Processing Visualization and Transmission, 2002, pp. 1-13.

International Preliminary Report on Patentability and Written Opinion of the International Searching Authority (Forms PCT/IB/373 and PCT/ISA/237) issued on Jun. 20, 2024, by the International Bureau of WIPO, in corresponding International Application No. PCT/EP2022/086763. (8 pages).

Scharstein et al., "A Taxonomy and Evaluation of Dense Two-Frame Stereo Correspondence Algorithms", International Journal of Computer Vision, Jan. 1, 2002, pp. 7-42, vol. 47, No. 1/3, XP055074772.

The extended European Search Report issued on Jun. 9, 2022, by the European Patent Office in corresponding European Application No. 21217108.6. (8 pages).

Vargas et al., "Stereo Correspondence Evaluation Methods: A Systematic Review", Advances In Biometrics: International Conference, ICB 2007, Aug. 27-29, 2007, pp. 102-111, XP047332097.

Yu et al., "Lite-HRNet: A Lightweight High-Resolution Network", http://arxiv.org/abs/2104.06403, School of Artificial Intelligence and Automation, Huazhong University of Science and Technology, Apr. 13, 2021. (11 pages).

* cited by examiner

RECEIVE/ACQUIRE IMAGE(S) — 201

DETERMINE IMAGE FEATURES — 202

DETERMINE DEPTH(S) USING TRIANGULATION — 203

ORDER IMAGE FEATURES ACCORDING TO DEPTH — 204

GENERATE IMAGE FEATURE GROUPS ITERATIVELY — 205

GENERATE SEED PROPOSAL(S) BY ADDING IMAGE FEATURE GROUPS — 206

GENERATE DIGITAL REPRESENTATION BY ADDING SEED PROPOSAL(S) — 207

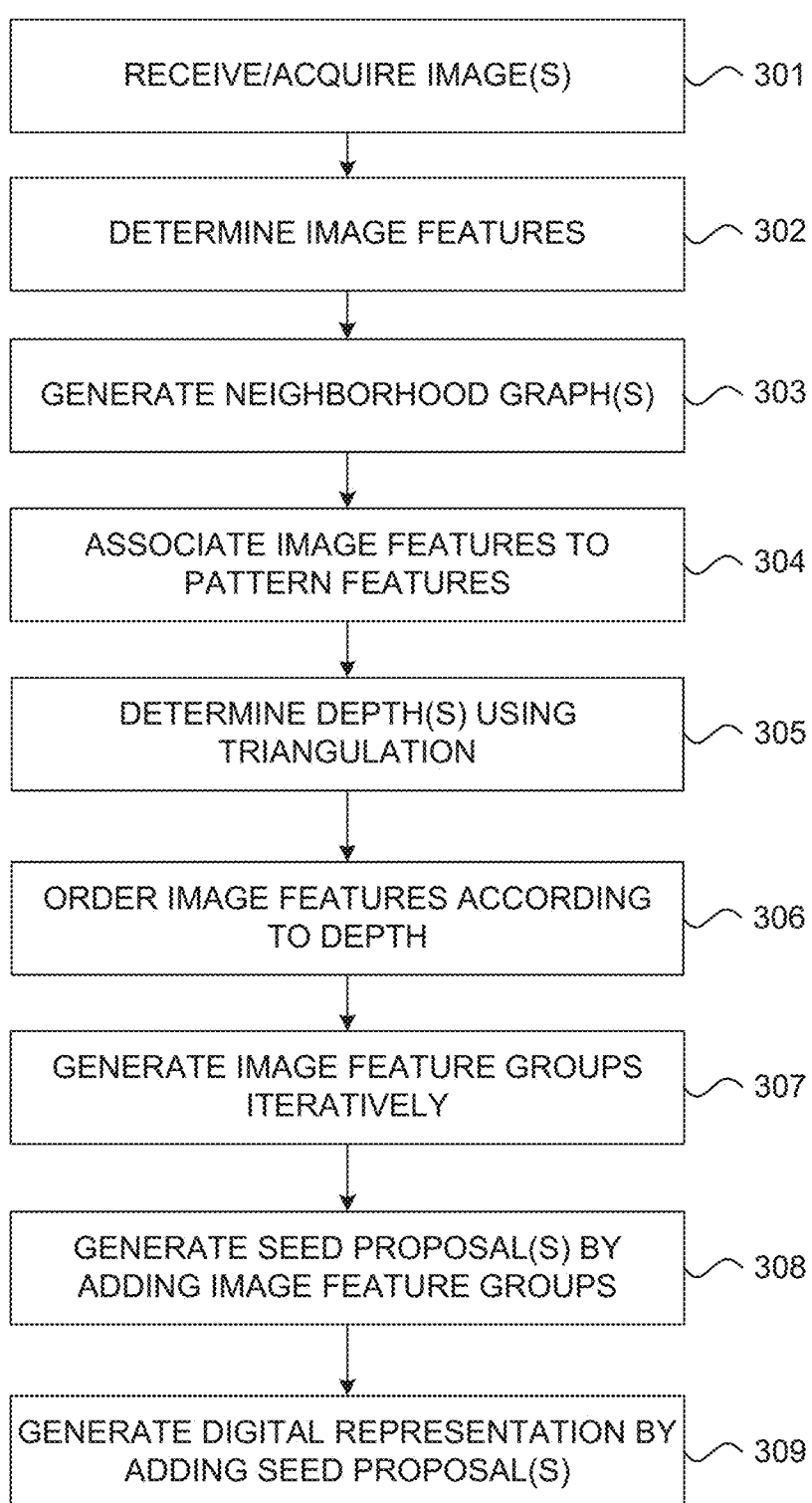

RECEIVE/ACQUIRE IMAGE(S) — 301

DETERMINE IMAGE FEATURES — 302

GENERATE NEIGHBORHOOD GRAPH(S) — 303

ASSOCIATE IMAGE FEATURES TO PATTERN FEATURES — 304

DETERMINE DEPTH(S) USING TRIANGULATION — 305

ORDER IMAGE FEATURES ACCORDING TO DEPTH — 306

GENERATE IMAGE FEATURE GROUPS ITERATIVELY — 307

GENERATE SEED PROPOSAL(S) BY ADDING IMAGE FEATURE GROUPS — 308

GENERATE DIGITAL REPRESENTATION BY ADDING SEED PROPOSAL(S) — 309

FIG. 3

PROJECT A CAMERA RAY IN 3D
FOR A GIVEN IMAGE FEATURE                          401

PROJECT A PROJECTOR RAY IN 3D
FOR EACH PATTERN FEATURE                           402

DETERMINE POINTS IN 3D WHEREIN THE CAMERA RAY
AND THE PROJECTOR RAY(S) INTERSECT WITHIN A        403
PREDEFINED DISTANCE

DETERMINE THE DEPTH OF EACH INTERSECTION           404

ASSIGN THE DEPTH(S) TO THE IMAGE FEATURE           405

DEFINE INITIAL DIGITAL REPRESENTATION — 801

CONSIDER SEED PROPOSAL(S) IN ORDER ACCORDING TO SIZE — 802

ANY IMAGE FEATURE GROUPS OF THE SEED PROPOSAL CURRENTLY PART OF THE DIGITAL REPRESENTATION? — 803

NO

ADD SEED PROPOSAL TO DIGITAL REPRESENTATION — 804

MARK IMAGE FEATURE GROUPS OF RECENTLY ADDED SEED PROPOSAL — 805

SYSTEMS AND METHODS FOR GENERATING A DIGITAL REPRESENTATION OF A 3D OBJECT

TECHNICAL FIELD

The present disclosure relates to systems and methods for generating a digital representation of a three-dimensional (3D) object. In particular, the disclosure relates to a computer-implemented method for generating a digital representation of a 3D object. The disclosure further relates to a dental scanning system for acquiring images of the object and for generating the digital representation of the object.

BACKGROUND

Digital dentistry is increasingly popular and offers several advantages over non-digital techniques. Digital dental scanning systems typically utilize a scanning device such as an intraoral 3D scanner to generate a three-dimensional digital representation of an intraoral three-dimensional object/surface of a subject. A variety of different technologies exist within scanning devices, such as triangulation-based scanning, confocal scanning, focus scanning, ultrasound scanning, x-ray scanning, stereo vision, and optical coherent tomography (OCT).

Optical scanning devices often feature a projector unit for projecting an illumination pattern onto the surface of a 3D object, and a camera/image sensor for acquiring one or more images of the illuminated object. Within focus scanning devices, the projector unit and the camera are typically positioned along the same optical axis. However, for triangulation-based scanning devices, the projector unit and the camera are offset such that they form a triangle with a given point on the surface of the illuminated object. In general, computer stereo vision and optical triangulation-based 3D scanning devices use triangulation to determine the spatial dimensions and/or the geometry of an object. In scanning systems employing triangulation, a central task is to solve the so-called correspondence problem.

Given two or more images of the same 3D object, taken from different points of view, the correspondence problem refers to the task of finding a set of points in one image which can be identified as the same points in another image. To do this, points or features in one image are matched with the corresponding points or corresponding features in another image. The images can be taken from a different point of view, at different times, or with objects in a scene in general motion relative to the camera(s). The correspondence problem can occur in a stereo situation when two images of the same object are acquired, or it can be generalised to an N-view correspondence problem. In the latter case, the images may come from either N different cameras photographing at the same time or from one camera which is moving relative to the object/scene. The problem is made more difficult when the objects in the scene are in motion relative to the camera(s).

In order to generate the three-dimensional digital representation of the scanned object, such as a person's teeth, the correspondence problem generally need to be solved, at least when using a triangulation-based scanning device to acquire the images of the object. In general, it is desired that the 3D digital representation is generated in real-time, or at least in what is perceived as real-time to the user, e.g. the dentist. Therefore, the 3D representation is typically generated simultaneously with the acquisition of images/scan data, such that the user can immediately view the generated 3D representation while scanning a patient. This is also considered important feedback to the user since it is very visible/clear when new scan data is added to the digital 3D representation. Consequently, it is desired that the correspondence problem is solved in a fast and reliable manner since it enables a fast generation of the 3D representation.

US 2020/404243 A1 relates to a method for generating a digital three-dimensional image; in particular to intraoral three-dimensional imaging using structured light illumination. The disclosed method includes comparing a series of images captured by each camera and determining which of the portions of the projected pattern can be tracked across the images.

US 2021/137653 A1 relates to a method of generating a virtual 3D model of a dental arch. The method includes receiving intraoral scans of a dental arch, determining a first depth of a first intraoral 3D surface in a first intraoral scan, and determining a second depth of a second intraoral 3D surface in the first intraoral scan.

US 2020/292297 A1 relates to a handheld three-dimensional (3D) measurement device, and particularly to a handheld 3D triangulation scanner. The document discloses a 3D measuring instrument which comprises a triangulation scanner having a projector and an image sensor.

LI ZHANG ET AL: "Rapid shape acquisition using color structured light and multi-pass dynamic programming" relates to a color structured light technique for recovering object shape from one or more images. The correspondence problem is solved using a multi-pass dynamic programming algorithm.

Thus, it is of interest to develop improved systems and methods for generating a digital 3D representation of a 3D object. In particular, it is desired to find improved methods for solving the correspondence problem and related issues within dental scanning systems.

SUMMARY

While techniques for solving the correspondence problem when projecting a time-varying light pattern exist, the problem becomes more difficult when using a static light pattern. Additional challenges occur when projecting a pattern with a high density of features. Such patterns are generally desired since a high-density pattern improves the resolution of the generated digital representation. However, utilizing a high-density pattern makes the correspondence problem even more difficult to solve.

The present disclosure addresses the above-mentioned challenges by providing a computer-implemented method for generating a digital representation of a three-dimensional (3D) object, wherein the digital representation is generated by adding collections of image features for which the correspondence problem has been solved. Accordingly, instead of solving the correspondence problem feature by feature, the presently disclosed method suggests solving the problem for collections of features, such that a consistent and reliable solution can be found for all features within the collection. Thereby, when generating the digital representation, entire collections of image features may be added to the representation. Thereby, the presently disclosed method offers a more robust and reliable solution to the correspondence problem within dental scanning systems.

In accordance with some embodiments of the presently disclosed method, the method comprises the steps of:
 acquiring two or more images of a three-dimensional (3D) object, wherein each image comprises a plurality of image features;

determining the image features in each of the images;

determining one or more depth(s) associated with each image feature (e.g. using a triangulation method);

generating image feature groups, wherein each image feature group comprises one or more image features;

generating one or more seed proposals, wherein each seed proposal comprises at least a predefined number of image feature groups, wherein the generation of each seed proposal comprises the steps of:

adding one or more image feature groups to a seed proposal based on one or more predefined first criteria;

accepting seed proposal(s) comprising at least the predefined number of image feature groups; and generating a digital representation of the 3D object by adding seed proposal(s) to the digital representation based on one or more predefined second criteria.

The two or more images of the three-dimensional (3D) object may be acquired using a scanning device such as an intraoral 3D scanning device. The scanning device may be configured for providing/transmitting the images to a processor and/or a computer system, said processor/computer system comprising means for carrying out at least some of the steps of the computer-implemented methods disclosed herein. Accordingly, the steps of the above described method may be performed by a processor or a computer system. In preferred embodiments, the scanning device comprises one or more processors configured for performing, at least partly, any of the computer-implemented methods disclosed herein.

The present disclosure further relates to a dental scanning system for generating a digital representation of a three-dimensional (3D) object, the scanning system comprising:

a scanning device comprising:

one or more projector units configured for projecting a predefined pattern onto the 3D object, wherein the pattern comprises a plurality of pattern features, wherein each projector unit is associated with a projector plane;

one or more cameras, preferably two or more cameras, for each projector unit, wherein each camera is configured for acquiring images of at least a part of the object, wherein each of the cameras has a predefined fixed position relative to the one or more projector units; and one or more processors configured to carry out any of the computer-implemented methods disclosed herein.

The present disclosure further relates to a computer program comprising instructions which, when the program is executed by one or more processors, causes the processor(s) to carry out any of the computer-implemented methods disclosed herein. The processor(s) may be part of the scanning device or the computer system. The present disclosure further relates to a computer-readable medium having stored thereon the computer program.

Preferably, the processor(s) are configured to perform one or more steps of the computer-implemented method(s) continuously, such that the digital representation is updated continuously during image acquisition in a scanning session. More preferably, the processor(s) are able to execute the steps of the method in real-time, or near real-time, such that the digital representation of the 3D object may be generated in real-time simultaneously with a user operating a scanning device for acquiring images of the object. During execution of the method, the image sets (e.g. in case of four cameras, a set of four images) are ideally processed so quickly that the processing is done by the time a new set of images is acquired, wherein the images are acquired at a predefined framerate, such as 25 frames per second (FPS) or higher. Such a scenario may be referred to herein as real-time processing. Accordingly, one or more steps of any of the disclosed methods herein may be performed continuously and/or in real-time.

The following description serves to outline the disclosed method on a general level. A more detailed description of the system and method is provided elsewhere herein. The first step of the method is to acquire a set of images, wherein the set comprises two or more images of a three-dimensional (3D) object, wherein each image comprises a plurality of image features. Typically, the two or more images will be acquired by a scanning device, such as an intraoral 3D scanning device, comprising one or more cameras for acquiring images. The images within a set of images may be acquired simultaneously, i.e. at the same moment in time. The scanning device further comprises one or more projector units for projecting a predefined pattern onto a surface of the 3D object. The projected pattern comprises a plurality of pattern features, such that the acquired images similarly comprise a plurality of image features. As an example, the projected pattern may be a checkerboard pattern, wherein the image/pattern features are defined as the corners of the checkerboard pattern. The corners may be understood as intersections of black and white squares in the pattern, such as marked in FIG. 18. Other examples are provided in the detailed description.

A next step of the method is to determine the image features within a set of images, preferably in each of the acquired images. The images constituting a set of images, such as four images in the case of four cameras, may preferably be acquired simultaneously in time. The determination of image features may be done using a neural network trained to determine the image features. The trained neural network may be configured to run on a neural processing unit (NPU), which may be located on the scanning device. Advantages of utilizing hardware acceleration, e.g. in the form of an NPU on the scanning device, are faster processing on the device, reduced power consumption, and a lower latency, i.e. increased performance of the scanning device. Another advantage is that by performing more of the processing on the scanning device, it reduces the required bandwidth of e.g. a wired/wireless connection from the scanning device to an external device.

A next step of the method may be, for each pattern feature/projector ray, to associate a number of image features among the determined image features to the pattern feature/projector ray. Each pattern feature may be associated with one or more image features, such as a plurality of image features. A next step of the method may be to determine, for each image feature, one or more possible depths of the image feature. Accordingly, several depths may be assigned to each image feature, since at this point it is not known which depth is the true solution to the correspondence problem for that particular image feature. The depth(s) may be determined by triangulation. A depth may be understood as the distance from the projector location along a given projector ray to a point in 3D, where said projector ray intersects a camera ray within a given tolerance/distance. In particular, a triangulation approach may be utilized in case each camera of the scanning device has a predefined fixed position relative to one or more projector units. In other words, the scanning system may be configured to determine points in 3D space based on a triangulation technique, wherein said points correspond to projected pattern features.

A next step of the method may be to sort the image features associated to a given pattern feature/projector ray according to depth. This sorting is preferably performed/ repeated for all pattern features. The sorted image features may be stored in a list. Then, the method may comprise the step of grouping image features in groups of predefined size, thereby generating image feature groups. This step may be performed iteratively, wherein a sliding window is used to look through the sorted list of image features to determine groups of image features each having a unique camera index, i.e. such that image features within the same group originates from images obtained using different cameras. A sliding window may in this context be understood as a mathematical technique, wherein a sub-list (sub-array) runs over an underlying collection/list/array. The sliding window technique is a well-known technique within mathematics. As an example, in case the scanning device comprises a projector unit and four cameras, the sliding window may have an initial size of four elements, such that initially groups of four image features are generated. In a next iteration, the size of the sliding window may be decreased such that groups of three image features are generated and so forth. This approach may be performed for all pattern features in the pattern.

A next step of the method may be to generate collections of image feature groups, said collections also referred to herein as seed proposals. A seed proposal preferably comprises at least a predefined number of image feature groups. Accordingly, a seed proposal is generated such that it comprises equal to or more than the predefined number of image feature groups. Image feature groups are preferably added to a seed proposal according to one or more first criteria, examples of which are given in the detailed description. A next step of the method is to generate a digital representation of the 3D object based on the seed proposal(s). The digital representation may be in the form of one or more point clouds comprising a plurality of 3D data points. The digital representation may be provided to a computer system for reconstructing a digital 3D model (e.g. a 3D surface model) based on the representation. The reconstruction may comprise the step of stitching point clouds received from the scanning device, and it may further comprise the step of fitting one or more surfaces to the stitched point clouds whereby a 3D surface model (digital 3D model) is generated. The 3D model may be rendered by a computer system and displayed on a display.

In accordance with some embodiments of the presently disclosed method, the method for generating the digital three-dimensional representation of a dental object comprises the steps of:

projecting a pattern on a surface of the dental object using an intraoral scanning device, wherein the pattern comprises a plurality of pattern features;

acquiring one or more sets of images, wherein each set of images comprises at least two images, wherein each image includes at least a portion of the projected pattern;

determining one or more image features within each set of images;

solving a correspondence problem within each set of images using a triangulation method, such that points in 3D space are determined based on the image features, wherein said points form a solution to the correspondence problem, wherein the correspondence problem is solved for groups of pattern features and/or image features; and generating a digital three-dimensional representation of the dental object, wherein the solution to the correspondence problem is used to generate the three-dimensional representation.

As mentioned previously, the step of determining one or more image features within each set of images may be performed by a neural network, such as a convolutional neural network (CNN), trained to perform said determination. The neural network may be executed on a neural processing unit (NPU) located on the intraoral scanning device. The step of solving the correspondence problem may include the steps of dividing the pattern features into one or more group(s) of pattern features for each set of images, wherein each group of pattern features is a connected subset within a regular grid; and wherein the solution to the correspondence problem is determined within each group of pattern features. A connected subset may be understood as a subset of pattern features, wherein any two pattern features are connected via a path going through adjacent features in the regular grid. A technical effect of utilizing connected subset of pattern features is that it improves the reliability of the solution to the correspondence problem, i.e. it provides for a more robust tracking algorithm. All solutions to the correspondence problem may be consistent within a group of pattern features/projector rays. In other words, if a given pattern feature is a member of the group and its neighbor is also in the group, then there exist potential points belonging to the two pattern features, wherein said points are neighboring points to each other in the respective images.

The present disclosure further relates to a dental scanning system for generating a digital three-dimensional representation of a dental object, the dental scanning system comprising:

an intraoral scanning device comprising:

one or more projector units configured to project a pattern on a surface of the dental object;

two or more cameras configured to acquire one or more sets of images, wherein each set of images comprises at least one image from each camera, wherein each image includes at least a portion of the projected pattern; and one or more processors configured to carry out one or more steps of the method described herein.

Accordingly, the method provides a framework for generating a digital representation of a 3D object, wherein the correspondence problem is solved for collections of pattern/ image features, such that features within such a collection are considered to form a consistent and reliable solution to the correspondence problem.

BRIEF DESCRIPTION OF THE DRAWINGS

FIG. 3 shows a flowchart of the disclosed method according to an embodiment, wherein the method is even more detailed than the one described in relation to FIG. 1.

DETAILED DESCRIPTION

Three-Dimensional Object

Figure 1:
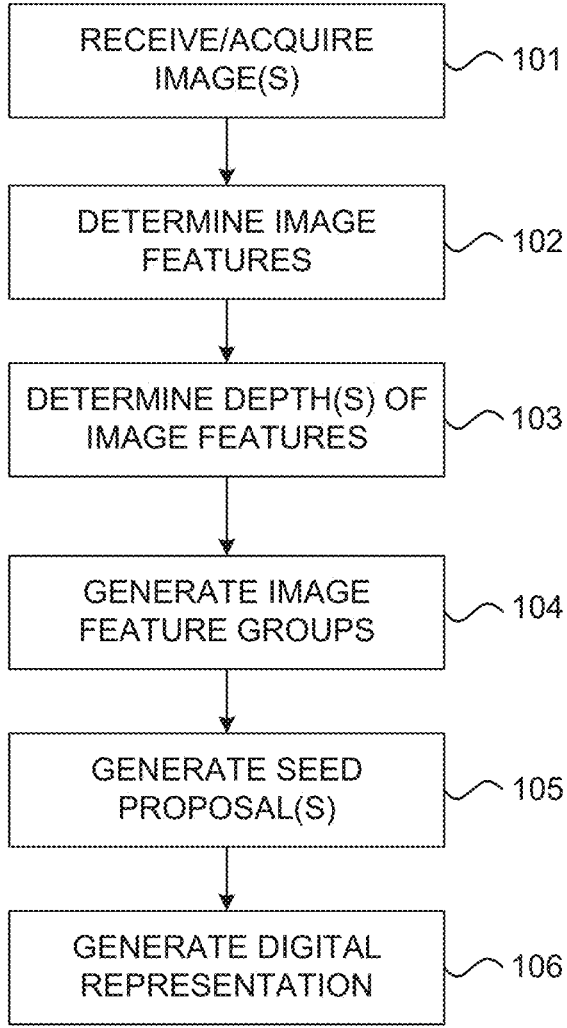
FIG. 1 shows a flowchart of the disclosed method according to an embodiment.

The three-dimensional (3D) object may be a dental object. Examples of dental objects include any one or more of: tooth/teeth, gingiva, implant(s), dental restoration(s), dental prostheses, edentulous ridge(s), and/or combinations thereof. Alternatively, the dental object may be a gypsum model or a plastic model representing a subject's teeth. As an example, the three-dimensional (3D) object may comprise teeth and/or gingiva of a subject. The dental object may only be a part of the subject's teeth and/or oral cavity, since the entire set of teeth of the subject is not necessarily scanned during a scanning session. A scanning session may be understood herein as a period of time during which data (such as images) of the 3D object is obtained.

Scanning Device

The scanning device may be an intraoral scanning device for acquiring images within an intraoral cavity of a subject. The scanning device may be a handheld scanning device. The scanning device may employ a scanning principle such as triangulation-based scanning, depth-from-focus scanning, optical coherent tomography (OCT), time-of-flight based scanning, or stereo vision. In preferred embodiments, the scanning device employs a triangulation-based scanning principle. The scanning device comprises at least one projector unit and at least one camera. Preferably, the scanning device comprises one or more scan heads, wherein each scan head comprises a projector unit and one or more cameras. As an example, the scanning device may comprise one scan head comprising one projector unit and at least two cameras. As another example, the scanning device may comprise one scan head comprising one projector unit and four cameras. In yet another example, the scanning device may comprise at least two scan heads, wherein each scan head comprises a projector unit and two or more cameras.

A projector unit may be understood herein as a device configured for generating an illumination pattern to be projected onto a surface, such as the surface of the three-dimensional object. The projector unit(s) may be Digital Light Processing (DLP) projectors using a micro mirror array for generating a time varying pattern, or a diffractive optical element (DOF), or back-lit mask projectors, wherein a light source is placed behind a mask having a spatial pattern, whereby the light projected on the surface of the dental object is patterned. The back-lit mask projector may comprise a collimation lens for collimating the light from the light source, said collimation lens being placed between the light source and the mask. In preferred embodiments, the projector unit(s) of the scanning device comprise at least one light source and a mask having a spatial pattern. The projector unit(s) may further comprise one or more lenses such as collimation lenses or projection lenses. Preferably, the projector unit(s) are configured to generate a predefined pattern, which may be projected onto a surface. The pattern may be a static pattern, i.e. a pattern that remains fixed in time. Each of the projector units may be associated with their own projector plane, which is determined by the projector optics. As an example, if the projector unit is a back-lit mask projector, the projector plane may be understood as the plane wherein the mask is contained. The projector plane may comprise/define a plurality of pattern features of the projected pattern. The pattern features may be arranged in a regular grid. A regular grid may be understood as a grid, wherein a section of the grid repeats throughout the grid.

The light source(s) may be configured to generate light of a single wavelength or a combination of wavelengths (mono- or polychromatic). The combination of wavelengths may be produced by a light source configured to produce light comprising different wavelengths (such as white light). In preferred embodiments, each projector unit comprises a light source for generating white light. The light source may be a multichromatic light source. Alternatively, the projector unit(s) may comprise multiple light sources such as LEDs individually producing light of different wavelengths (such as red, green, and blue) that may be combined to form light comprising different wavelengths. Thus, the light produced by the light source(s) may be defined by a wavelength defining a specific color, or a range of different wavelengths defining a combination of colors such as white light. In an embodiment, the projector unit(s) comprise a light source configured for exciting fluorescent material to obtain fluorescence data from the dental object such as from teeth. Such a light source may be configured to produce a narrow range of wavelengths. In other embodiments, the scanning device comprises one or more infrared light sources configured to emit infrared light, which is capable of penetrating dental tissue.

The pattern is preferably defined by a mask having a spatial pattern. The pattern may comprise a predefined arrangement comprising any of stripes, squares, dots, triangles, rectangles, and/or combinations thereof. In preferred embodiments, the generated illumination pattern is a checkerboard pattern comprising a plurality of checkers. Similar to a common checkerboard, the checkers in the pattern have alternating dark and light color corresponding to areas of low light intensity (black) and areas of high(er) light intensity (white). Hence, for ease of reference, the checkers of the checkerboard pattern will be referred to herein as white and black checkers. The pattern preferably comprises a plurality of pattern features. When projecting a pattern comprising such pattern features onto a surface of the 3D object, the acquired images of the object will similarly comprise a plurality of image features corresponding to the pattern features. A pattern/image feature may be understood as an individual well-defined location in the pattern/image. Examples of image/pattern features include corners, edges, vertices, points, transitions, dots, stripes, etc. In preferred embodiments, the image/pattern features comprise the corners of checkers in a checkerboard pattern. In other embodiments, the image/pattern features comprise corners in a polygon mesh such as a triangle mesh.

A camera may be understood herein as a device for capturing an image of an object. Each camera comprises an image sensor for generating an image based on incoming light e.g. received from the illuminated 3D object. Each camera may further comprise one or more lenses for focusing light. As an example, the image sensor may be an electronic image sensor such as a charge-coupled device (CCD) or an active-pixel sensor (CMOS sensor). Each image sensor has an image plane, which is the plane that contains the object's projected image. Each image obtained by the image sensor(s) comprises a plurality of image features, wherein each image feature originates from a pattern feature of the projected pattern.

In accordance with some embodiments, the scanning device comprises one or more processors configured for performing one or more steps of the described methods. The scanning device may comprise a first processor configured for determining image features in the acquired images. The first processor may be configured to determine the image features using a neural network, such as a convolutional neural network. The first processor may be selected from the group of: central processing units (CPU), accelerators (off-load engines), general-purpose microprocessors, graphics processing units (GPU), neural processing units (NPU), application-specific integrated circuits (ASIC), field-programmable gate arrays (FPGA), dedicated logic circuitry, dedicated artificial intelligence processor units, or combinations thereof. As an example, the first processor may be a field-programmable gate array (FPGA). As another example, the first processor may be a neural processing unit (NPU). The NPU may be configured to execute one or more machine learning algorithms. A neural processing unit may be understood herein as a circuit configured to implement control and arithmetic logic necessary to execute machine learning algorithms, such as the neural network described herein. The scanning device may further comprise computer memory for storing instructions, which when executed, causes the first processor to carry out the step of determining image features in the acquired images. The scanning device may further comprise a second processor configured for performing the steps of carrying out the computer-implemented method for generating a digital representation of a three-dimensional (3D) object. As an example, the second processor may be configured for running a tracking algorithm comprising the steps of:

assigning one or more depth(s) to each image feature, wherein the depth(s) are determined using a triangulation method;

generating image feature groups, wherein each image feature group comprises one or more image features;

generating one or more seed proposals, wherein each seed proposal comprises at least a predefined number of image feature groups, wherein the generation of each seed proposal comprises the steps of:

adding one or more image feature groups to a seed proposal based on one or more predefined first criteria;

accepting seed proposal(s) comprising at least the predefined number of image feature groups; and generating a digital representation of the 3D object by adding seed proposal(s) to the digital representation based on one or more predefined second criteria.

The computer memory may further store instructions, which when executed, causes the second processor to carry out the method of generating a digital representation of a three-dimensional (3D) object. As an example, the second processor may be a central processing unit (CPU) such as an ARM processor or another suitable microprocessor. As an alternative, the second processor may be a graphics processing unit (GPU), an application-specific integrated circuit (ASIC), or a field-programmable gate array (FPGA). The second processor may comprise computer memory. The first and second processor may both be located on the scanning device, and they may be operatively connected such that the first processor provides input to the second processor. Alternatively, the first processor may be located on the scanning device, and the second processor may be located on the computer system described herein. As an example, the first processor may be configured to determine image features in the images, and subsequently provide data related to the determined image features to the second processor. The data may comprise image feature coordinates as well as other attributes such as a camera index or a predefined property, such as the phase, of the image feature(s). The second processor may then be configured to generate the digital representation of the 3D object, e.g. in the form of a point cloud. The scanning device may be further configured to provide the digital representation to a computer system for rendering the representation. The computer system may further process the digital representation, e.g. by stitching the point clouds received from the scanning device and/or by fitting one or more surfaces to the stitched point clouds. This further processing by the computer system may also be referred to herein as reconstruction. The output of the reconstruction is a digital 3D model of the scanned object. The digital 3D model may be rendered and displayed on a display, e.g. connected to the computer system.

Wireless Module

The scanning device preferably comprises a module for transmitting data, such as images or point clouds, to one or more external devices, such as a computer system. The module may be a wireless module configured to wirelessly transfer data from the scanning device to the computer system. The wireless module may be configured to perform various functions required for the scanning device to wirelessly communicate with a computer network. The wireless module may utilize one or more of the IEEE 802.11 Wi-Fi protocols/integrated TCP/IP protocol stack that allows the scanning device to access the computer network. The wireless module may include a system-on-chip having different types of inbuilt network connectivity technologies. These may include commonly used wireless protocols such as Bluetooth, ZigBee, Wi-Fi, WiGig (60 GHz Wi-Fi) etc. The scanning device may further (or alternatively) be configured to transmit data using a wired connection, such as an ethernet cable.

The scanning device is preferably configured to acquire sets of images, wherein a set of images comprises an image from each camera of the scanning device. As an example, if the scanning device comprises four cameras, the scanning device may continuously acquire sets of four images, wherein the correspondence problem is solved continuously within each set of images. The scanning device may be configured to solve the correspondence problem in two main steps: a first step, wherein image features in the images within a set of images are determined, and a second step, wherein 3D points are determined based on triangulation. Finally, a 3D representation of the scanned object may be generated based on the 3D points. In some embodiments, the scanning device comprises a first processor, wherein the first processor is configured to execute the step of determining the image features in the images. The scanning device may employ hardware acceleration, e.g. by including a neural processing unit as the first processor.

In some embodiments, the scanning device is configured to transmit the determined image features and/or the corresponding/acquired images, wherein said images have been compressed using a suitable compression. The data, such as the images and/or image features, may be transmitted wirelessly. As an example, a lossy compression may be utilized, such as a JPEG compression. An advantage of using a lossy compression is that the data transfer rate (i.e. the bit rate) is lowered, whereby the transfer rate is enhanced for wireless transmission. Consequently, a more smooth scanning experience is created, wherein the user experiences very low latency between acquisition of data and generation of the 3D representation. Another advantage of utilizing compression of the data is that it lowers the bandwidth requirement of a wireless connection (e.g. Wi-Fi) between the scanning device and an external device. In some embodiments, the scanning device is configured to continuously transmit compressed images to an external device using a video compression standard, such as H.264 or H.265. Accordingly, the scanning device may be configured to stream a video of images to an external device, such as a computer system, which is configured to decode and/or display the images. The dental scanning system may comprise a display for displaying the video stream.

In some embodiments, the first step (determination of image features) is solved on the scanning device, whereas the second step (determination of 3D point by triangulation) is solved on an external device, such as a computer system external to the scanning device. An advantage hereof, is that less processing is performed by the scanning device, whereby less heat is generated on the scanning device. In some embodiments, the acquired images are compressed and transmitted to a computer system, wherein the computer system is configured to solve the correspondence problem based on the images as outlined herein. In other embodiments, the determined image features are transmitted to a computer system, wherein the computer system is configured to solve the correspondence problem based on the determined image features.

In some embodiments, the scanning device comprises one or more processors, such as a first processor and a second processor, wherein the one or more processors are configured to individually or in collaboration solve the entirety of the correspondence problem. The one or more processors may be further configured to generate a 3D representation of the scanned object, such as the dental object. As an example, the scanning device may comprise a first processor configured to execute the step of determining the image features in the images, and a second processor configured to execute the steps of determining 3D points by triangulation and generating a digital representation of the 3D object. An advantage of running the processing on the scanning device is both to free up computational resources on the external computer system, such that it can perform other tasks, and further to reduce the amount of data that needs to be transferred to the external computer system. Finally, it allows the scanning device to function more autonomously, e.g. it may generate 3D data for simple applications like production or support tools without sophisticated software running on the external computer.

Computer System

A computer system may be understood as an electronic processing device for carrying out sequences of arithmetic or logical operations. In the present context, a computer system refers to one or more devices comprising at least one processor, such as a central processing unit (CPU), along with some type of computer memory. The processor(s) of the computer system may include one or more of a CPU, an accelerator, a microprocessor, graphics processing units (GPU), a neural processing unit (NPU), an application-specific integrated circuit (ASIC), a field-programmable gate array (FPGA), a dedicated logic circuitry, a dedicated artificial intelligence processor unit, or combinations thereof. Examples of computer systems falling within this definition include desktop computers, laptop computers, computer clusters, servers, cloud computers, quantum computers, mobile devices such as smartphones and tablet computers, and/or combinations thereof.

The computer system may comprise hardware such as one or more central processing units (CPU), graphics processing units (GPU), and computer memory such as random-access memory (RAM) or read-only memory (ROM). The computer system may comprise a CPU, which is configured to read and execute instructions stored in the computer memory e.g. in the form of random-access memory. The computer memory is configured to store instructions for execution by the CPU and data used by those instructions. As an example, the memory may store instructions, which when executed by the CPU, cause the computer system to perform, wholly or partly, any of the computer-implemented methods disclosed herein. The computer system may further comprise a graphics processing unit (GPU). The GPU may be configured to perform a variety of tasks such as video decoding and encoding, rendering of the digital representation, and other image processing tasks. In some embodiments, the GPU is configured to perform the step of determining image features using a neural network. In some embodiments, a neural processing unit (NPU) is configured to perform the step of determining image features using a neural network as described herein. The NPU may be located on the scanning device or it may be external to the scanning device.

The computer system may further comprise non-volatile storage in the form of a hard disc drive. The computer system preferably further comprises an I/O interface configured to connect peripheral devices used in connection with the computer system. More particularly, a display may be connected and configured to display output from the computer system. The display may for example display a 2D rendering of the generated digital 3D representation. Input devices may also be connected to the I/O interface. Examples of such input devices include a keyboard and a mouse, which allow user interaction with the computer system. A network interface may further be part of the computer system in order to allow it to be connected to an appropriate computer network so as to receive and transmit data (such as scan data and images) from and to other computing devices. The CPU, volatile memory, hard disc drive, I/O interface, and network interface, may be connected together by a bus.

The computer system is preferably configured for receiving data from the scanning device, either directly from the scanning device or via a computer network such as a wireless network. The data may comprise images, processed images, point clouds, sets of data points, or other types of data. The data may be transmitted/received using a wireless connection, a wired connection, and/or combinations thereof. The computer system may be configured for performing any of the computer-implemented methods disclosed herein, either fully or partly. In some embodiments, the computer system is configured for carrying out the computer-implemented method for generating a digital representation of a three-dimensional (3D) object as described herein. In some embodiments, the computer system is configured for receiving data, such as point clouds, from the scanning device and then subsequently perform the steps of reconstruction and rendering a digital representation of a three-dimensional (3D) object. Rendering may be understood as the process of generating one or more images from three-dimensional data. The computer system may comprise computer memory for storing a computer program, said computer program comprising computer-executable instructions, which when executed, causes the computer system to carry out the method of generating a digital representation of a three-dimensional (3D) object.

Acquiring Images

In accordance with preferred embodiments of the present disclosure, the method comprises the step of acquiring images of a three-dimensional (3D) object. The images are preferably acquired using a scanning device comprising one or more scan heads, wherein each scan head comprises a projector unit and one or more cameras. The scanning device may be an intraoral scanning device for acquiring images inside the oral cavity of a subject. The projector unit(s) of the scanning device are configured for projecting a predefined illumination pattern, such as a static pattern, onto a surface, e.g. onto the surface of the three-dimensional object. Once projected on the surface, some light will be reflected from the surface, which may then enter the camera(s) of the scanning device, whereby images of the 3D object can be acquired.

The images are preferably acquired using one or more cameras per projector unit, such as at least two cameras or at least four cameras for each projector unit. In accordance with preferred embodiments of the present disclosure, one or more sets of images are acquired, wherein each set of images comprises at least one image obtained from each camera, wherein each image includes at least a portion of the projected pattern. As an example, if the scanning device comprises N cameras for a given projector unit, a set of images may be understood as N images, wherein a solution to the correspondence problem exists within said set of images. The scanning device may continuously acquire sets of images, wherein the scanning device is configured to continuously and in real-time solve the correspondence problem within each of said sets of images.

In preferred embodiments, each scan head of the scanning device comprises a projector unit and four cameras. The images may be processed by a processor located on the scanning device, and then subsequently transmitted to the computer system. The images may also be transmitted, without any processing, to the computer system. In some embodiments, both raw images and processed images are transmitted by the scanning device to a computer system. In some embodiments, a processor located on the scanning device, receives the images as input and provides determined image features within the images as an output. In other embodiments, the processor provides the determined image features to a second processor configured to provide 3D data, such as one or more point clouds, as output by executing one or more steps of the disclosed computer-implemented method.

Determining Image Features

In preferred embodiments of the presently disclosed method, the method comprises the step of determining image features in the acquired images. This step is preferably performed by a processor, which may be located on the scanning device or on the computer system. Preferably, this step includes determining all image features in each image within a set of images. The correspondence problem is preferably solved within each set of images. In accordance with preferred embodiments, the image features are determined using a neural network, which is trained to identify image features based on input data comprising images. An example of how the neural network is trained is provided elsewhere in the description. The neural network may form part of a computer program configured to run on a processor, e.g. located on the scanning device. The neural network may be configured to run on a neural processing unit (NPU), which may be located on the scanning device. An advantage of implementing the neural network on an NPU is that machine learning workloads are typically highly parallelizable, which means they are more efficiently implemented on an NPU specialized for this purpose. Thus, the processing, e.g. the determination of image features, can run faster if implemented on an NPU. In particular, if the scanning device comprises an NPU, the image feature identification can be performed faster, which enables running the processing step of determining image features on the scanning device faster.

The neural network may be trained and/or configured to receive a plurality of the acquired two-dimensional images as input and then for each image output the determined image features in the image as well as the phase of said features. In particular, the plurality of 2D images may be acquired by multiple cameras, such that sets of 2D images are obtained, wherein a set of images comprises at least one image from each camera. The correspondence problem may then be solved for said sets of 2D images as described herein. In preferred embodiments, the image features are corners in a checkerboard pattern. As explained previously, the images are obtained by projecting an illumination pattern onto the surface of the object, and then acquiring images of light reflected from said object. Accordingly, the acquired images will comprise a pattern similar to the projected pattern, however the pattern in the images may be distorted due to the contour of the surface of the object compared to the mask pattern.

Since the projected pattern comprises a plurality of pattern features, such as corners in a checkerboard pattern, the acquired images will similarly comprise a plurality of image features. Each image feature originates from a pattern feature. One problem is then to figure out how to match features in the images with the corresponding features in the projector plane. This problem is also generally known as the correspondence problem in computer vision and stereo vision. If multiple images are acquired by multiple cameras, i.e. at least one image for each camera, then the correspondence problem may be stated as how to identify corresponding image features in each of the acquired images, i.e. which image features in one image correspond with which image features in another image, and furthermore which image features correspond with which pattern features. The projector plane may mathematically also be viewed as an image plane, even though the pattern of the projector plane is known a priori. Hence, the pattern features are known beforehand. Accordingly, it is an object of the present disclosure to describe a method that solves the correspondence problem in a new and efficient way.

Training of the Neural Network

The neural network may be trained using supervised learning where a set of example inputs is provided along with desired outputs for each input. The set of example inputs and outputs may constitute the training dataset for the neural network. The difference between the output of the network and the desired output can be quantified according to some cost function, e.g., cross entropy. Furthermore, one or more parameters of the neural network may be adjusted during the training to minimize the cost function using standard techniques such as gradient descent, backpropagation etc. If the set of example inputs and outputs (the training dataset) is large enough, the neural network is able to deliver outputs close to the desired ones, also for inputs never encountered during training.

The desired output for a given input depends on what the neural network is required to do. In some embodiments, the desired outputs include pixel level annotation of where the features of a structured light pattern are located, i.e. the location of pattern features, a pixel level depth map of the corresponding 3D surface or labels for classifying pixels into light and dark checkers.

The training dataset may include digital renderings of dental objects based on existing 3D representations. This enables the desired output to be calculated so that no manual annotation is required. Furthermore, the position at various times of the intraoral scanning device used to generate the original 3D representations may be recorded and used as the pose from which to render training images. This may improve the neural network such that it performs better in realistic poses used during scanning.

Parameters of the rendering may be varied across the different images used for training such as exposure, color balance and camera parameters. This can create more data without the need to perform more rendering and can make the network more robust to changes in illumination, geometry etc.

Some parts of the training dataset can be made to simulate diffuse surfaces such as gypsum, e.g., by suppressing specular reflection and subsurface scattering. This can ensure that the network will also perform well on other materials than enamel and gingiva. The training dataset may be chosen to overrepresent challenging geometries such as scan flags, preparations and margin lines. This makes it more likely that the network will deliver desired outputs for such situations in the field.

Generating Neighborhood Graphs

A neighborhood graph may be understood herein as a two-dimensional (2D) map (or a discrete graph) comprising the position(s) of a plurality of image features associated with an image. The neighborhood graph preferably further comprises predefined properties of these features such as their phase in the pattern as well as neighborhood information about each feature to be described in more detail below. The image feature position(s) may be defined by image coordinates. Image coordinates may be understood as numerical coordinates, e.g. defined in a pixel coordinate system or a cartesian coordinate system. As an example, the image coordinates may comprise an x-coordinate and a y-coordinate, such that the pair (x, y) uniquely defines the position of the image feature in the image. Each pair may further be associated with an intensity corresponding to the pixel intensity or gray level of the image at the point defined by those coordinates. The neighborhood graph may comprise additional information such as one or more predefined properties of the image features as well as a camera index denoting which camera obtained the image associated with the neighborhood graph. The camera index may also be an attribute of the image features in the neighborhood graph such that image features within the same neighborhood graph have the same camera index. As an example, the projected pattern may be a checkerboard pattern with alternating checkers of black and white. Each checker can be described as having four corners, four edges, and a color (black/white). In this example, the image features and pattern features may constitute the corners of the checkers. Consequently, each of said image/pattern features (here corners) is associated with a phase, which can take only two values (binary). Accordingly, an example of a predefined property of the image features is the phase. The phase can be either black-white (BW) or white-black (WB). A corner in a checkerboard pattern will be surrounded by four checkers, wherein two of said checkers are black and the other two are white. A phase of BW corresponds to a corner, wherein the top left checker is black, and the top right checker is white. A phase of WB is exactly opposite the phase of BW. Hence a phase of WB corresponds to a corner, wherein the top left checker is white, and the top right checker is black. The phase could equally well be defined by the bottom checkers, i.e. the checkers below the corner, instead. The phase could also be defined by all the four checkers surrounding the corner. However, for simplicity, the phase is defined from only two of the four checkers. As mentioned previously, 'white' may be understood as referring to areas of higher light intensity than 'black'. Ideally, the transition between white and black checkers is completely sharp, however, in reality the transition is somewhat smeared out.

In accordance with preferred embodiments, the method comprises the step of determining image features, such as corners, in the acquired images, e.g. using a neural network. The neural network is preferably further trained or configured to determine the predefined properties, e.g. the phase, of the image features. This may be performed simultaneously with the determination of the image features. The neural network may be further trained or configured to determine the color of the checkers, i.e. in order to classify each pixel in the images as either black or white. The training dataset of the neural network may include labels classifying pixels as belonging to black or white checkers. An advantage of using a projection pattern wherein each pattern feature is associated with a phase, which can take only two values, is that the correspondence problem is reduced to two smaller correspondence problems, which are easier to solve. Consequently, the reduced problem imposes less requirements on the system both computationally and physically. Thereby, the correspondence problem becomes computationally faster to solve. It is generally desired to solve the correspondence problem as fast as possible to generate the digital representation of the three-dimensional (3D) object continuously and preferably in real-time. Advantageously, the step of determining image features within sets of images is performed by a neural network implemented on a neural processing unit.

In the projector pattern, each pattern feature will generally be surrounded by a number of adjacent/neighboring pattern features, such as eight neighbors in the case of a checkerboard pattern (except near boundaries). For each feature, the neighborhood graph may store references to the other features in the graph corresponding to those neighbors. In the case of a checkerboard pattern, these neighbors may be found by removing a part of the image around each feature and flood-filling the regions adjacent to the feature in question according to pixel classification into either black or white pixels. The neighbors can then be found as the features on the borders of the flood-filled regions. Furthermore, if the neighbors around a given feature in the projector pattern are ordered in some way, e.g., starting from the upper left corner and going clockwise, the neighbors in the image can be ordered in the same way, so that for each neighbor index in the projector pattern the neighborhood graph stores a reference to the corresponding neighbor feature in the image, provided it exists.

Accordingly, the method may comprise the step of generating a neighborhood graph for each image, wherein the generation of each of the neighborhood graphs comprises the step of determining, for each of the acquired images, a plurality of image features, wherein each image feature corresponds to a pattern feature, and wherein each image feature is associated with a set of image coordinates in 2D, a camera index indicating which camera acquired the image and predefined properties such as the phase of the feature. Finally, the generation of the neighborhood graph preferably comprises a step of storing references for each feature to the neighboring features in the graph as described above.

Rejecting Image Features

In some embodiments, the method comprises the step of determining, according to one or more predefined criteria, whether one or more of the determined image features should be rejected. Examples of predefined criteria include: Is the phase of the image features similar to the phase of the pattern features in the projector plane? Is the phase of neighboring image features correct in a predefined area surrounding each image feature? In the case of a checkerboard pattern, is the length of the edges of the checkers surrounding the evaluated image feature correct, i.e. does it correspond with the length of the edges in the pattern in the projector plane? In case one or more of said criteria is not met, i.e. if the answer to one or more of the aforementioned questions is no, the image feature under evaluation may be rejected. In some embodiments, an image feature is only rejected if two or more of the predefined criteria are not met. The neighborhood graph(s) may be updated in case any image features are rejected, such that each neighborhood graph only comprises non-rejected image features.

Associating Image Features to Pattern Features

At this point, a neighborhood graph comprising information of the image features (position, neighbor information and other properties such as phase) has preferably been generated for each of the acquired images. As a next step, the method may comprise the step of associating image features to pattern features. Each pattern feature may be associated with a number of image features, such as zero or more image features. To associate image features to pattern features any suitable techniques may be used, such as techniques employing projective geometry or epipolar geometry.

This paragraph serves to illustrate one example of how image features may be associated to pattern features using epipolar geometry. In general, epipolar geometry describes the relation between two resulting views, i.e. when two cameras obtain an image of the same 3D object from two different points of view. The relationship between one camera and one projector unit may similarly be described by epipolar geometry. In the following example, the images are obtained using two or more cameras, wherein each camera has a predefined fixed position relative to the other and to the one or more projector units of the scanning device. The example can be generalized to more cameras and more projector units. Each camera is configured to capture a 2D image of the 3D object. This conversion from 3D to 2D is referred to as a perspective projection. This projection operation can be modelled by rays that emanate from the camera, passing through its focal center, also referred to herein as camera rays. Each emanating ray corresponds to a single point in the image of that camera.

As an example, to associate a given image feature with a pattern feature, a camera ray emanating from a first camera passing through its focal center and the image feature in the image plane of that camera is considered. This camera ray will appear as a point in the image plane of the first camera. However, the projector unit (or a second camera) will see the ray emanating from the first camera as a line/curve in the projector plane (in a realistic scenario where lens distortion is present, the line will not be a straight line), since the projector unit and camera views the object from two different views. The projected line/curve may also be referred to as an epipolar line. Accordingly, when camera rays associated with image features are projected onto the image plane of other cameras or onto projector planes, said rays form curves in those planes, and those curves are referred to herein as epipolar lines. It should be noted that only in the ideal case (i.e. with no lens distortion present) are the epipolar lines straight lines. In general, when a 3D line, such as a camera ray or a projector ray, is projected onto a plane, said line forms a curve in the plane. The action of (virtually) projecting a camera ray, said camera ray passing through the image feature and the focal center of the camera which acquired the image, onto the projector plane, whereby an epipolar line is obtained, may simply be referred to herein as projecting an image feature onto the projector plane or simply projecting image feature(s).

Each image feature in each image gives rise to an epipolar line in the projector plane when it is projected onto this plane. In accordance with preferred embodiments, the method comprises the step of associating, for each pattern feature in the projector plane, a number of image features among the determined image features, wherein the association of image features to pattern features comprises the steps of:

projecting, for each image, each of the determined image features onto the projector plane whereby an epipolar line is obtained for each projected image feature; and associating, for each pattern feature, any image features whose corresponding epipolar line passes within a predetermined distance to a pattern feature.

The above method is exemplified for a scanning device comprising at least one projector unit and one or more cameras. However, the method may equally well be extended to scanning devices comprising two or more scan heads, wherein each scan head comprises an projector unit and one or more cameras, such as two or more cameras. Accordingly, the method may comprise the step of associating, for each pattern feature in each projector plane, a number of image features among the determined image features. The distance between a given pattern feature and a given epipolar line may be defined as the shortest distance from the pattern feature to any point on the epipolar line. This distance may be calculated using known methods. The method may specify a predetermined distance, such as a 2D distance, setting a threshold for when epipolar lines are close enough to be associated with a given pattern feature. Any epipolar lines, wherein the shortest distance from the line to the pattern feature exceeds the predetermined distance are then not associated with that particular pattern feature. For some pattern features it may not be possible to associate any image features, i.e. in that case zero image features are associated. This may be the case e.g. if the projector ray corresponding to a given pattern feature does not hit the 3D object at all.

The aforementioned approach of associating image features to pattern features is based on projective geometry. Such an approach ideally assumes no lens distortion. In reality, lens distortion, in particular large values of lens distortion, in the optical system means that 3D lines in space do not form straight lines when projected onto a plane. Traditionally, epipolar lines in epipolar geometry refer to straight lines in an image plane or projector plane. However, in this context, an epipolar line simply refers to a line in 3D which is projected onto a 2D plane, thereby forming a curve. In case lens distortion is present in the optical system (e.g. the scanning device), such a curve will not be a straight line. A number of known mathematical models exist, which can correct for both radial distortion and for tangential distortion caused by physical elements in a lens not being perfectly aligned. An example of such a mathematical model is the Brown-Conrady model, which may be implemented to correct for distortion or to model the distortion.

At this point, a neighborhood graph comprising information of the image features (position and other properties such as phase) has preferably been generated for each of the acquired images. Accordingly, each neighborhood graph stores information of the image features, such as the 2D position of each determined image feature along with the predefined property. Furthermore, each pattern feature has been associated with a number of image features. Preferably, the next step of the disclosed method is to determine (and assign) the possible depth(s) of the determined image features in the acquired images.

Determining Depths of Image Features

In the following, an example of how to determine the depths using a triangulation method is given. Each pattern feature in the projector plane may be projected in 3D by emanating a projector ray from the projector through the pattern feature. This is analogous to emanating camera rays from the cameras through the image features, as previously explained. Similarly, a camera ray may be projected in 3D for each image feature, wherein the camera ray emanates from the camera of that particular image feature. It should be noted that these projections are performed virtually by a processor implementing or executing the described method. In other words, for each pattern feature, a projector ray is considered in 3D along with the camera rays of the associated image features. Theoretically, the camera rays should intersect each other perfectly at unique 3D points. However, in the real world the camera rays do not intersect precisely through a given 3D point, due to e.g. geometric distortions or blurring of unfocused objects caused by lenses and finite sized apertures. Therefore, it is more relevant to determine 3D points where the camera rays and projector ray cross each other within a predefined distance. If multiple camera rays intersect a given projector ray within the predefined distance and at similar depths, this is equivalent to the cameras 'agreeing' on a particular image feature, i.e. this image feature appears in both/all images and the intersection may be used to assign a depth to the image feature. This method step is repeated for all pattern features, i.e. all projector rays are considered along with camera rays of the associated image features, whereby one or more depth(s) may be assigned to each image feature. Accordingly, several depths may be assigned to each image feature, e.g. one depth for each projector ray that the camera ray corresponding to that image feature passes close to. Here, the term 'close to' may be understood as intersecting within a predefined distance as explained above. It should be noted that the depths are measured along each projector ray, i.e. from the projector location to the intersections described previously.

As an example, a scanning device comprising a projector unit and four cameras is considered. In this example, at least one image is acquired by each camera, whereby at least four images are acquired. A neighborhood graph may be generated for each image and the image features may be associated to pattern features as previously explained. Then, for each pattern feature in the projector plane, a projector ray is projected in 3D together with up to four camera rays, one from each camera, wherein each camera ray pass through an image feature associated with the considered projector ray. All intersections (3D points), wherein the camera rays cross a given projector ray within the predefined distance, are then determined, whereby potentially one or more depths may be assigned to the image features for the projector ray. In some cases, no depth can be assigned to an image feature for the considered projector ray. The method may further comprise the step of ordering the determined image features according to depth. The image features may be stored in a list, wherein the list is sorted according to image feature depth. Such a list may be generated for each pattern feature/projector ray.

In accordance with some embodiments of the method, the step of determining one or more depths associated with each image feature comprises the steps of:

projecting, for each camera, a camera ray for each of the image features in the acquired images, wherein each camera ray is projected in 3D;

projecting a projector ray for each pattern feature, wherein each projector ray is projected in 3D;

determining points in 3D, wherein the camera rays associated with image features of different camera index intersect the projector ray within a predefined distance, wherein each of the determined points corresponds to a depth;

assigning the depth(s) to each image feature; and optionally ordering the image features associated to each pattern feature according to depth.

Generating Image Feature Groups

As a next step, the image features are preferably grouped in image feature groups. Accordingly, the method may comprise the step of generating image feature groups, wherein each image feature group comprises one or more image features. Preferably, the image features within an image feature group each has a unique camera index.

In the following, an example of how to generate image feature groups is provided. In this example, the method further comprises the step of ordering the determined image features (for each pattern feature) according to depth prior to the generation of image feature groups. Then, the image feature groups may be generated using a sliding window approach, wherein a sliding window of a predetermined size is used to group image features, wherein image features within an image feature group each has a unique camera index. Accordingly, the sliding window may be applied to the list of image features sorted according to depth, wherein each instance of a group of image features is stored, said group having an amount of image features corresponding to the predetermined size of the window, wherein each image feature within the group has a unique camera index. Each time an image feature group is generated/stored, the image features of that particular group are preferably marked to keep track of used features, i.e. image features already forming part of a group. Image features within the same group are corresponding image features obtained from different images. Therefore, image features within an image feature group are expected to have approximately the same depth.

In general, the number of cameras of the scanning device may be denoted N. In some embodiments of the disclosed method, a sliding window of size Nis applied to the list of image features. As an example, the images may be acquired by a scanning device having four cameras, which corresponds to N=4. In that case, the sliding window will similarly have a size of 4, such that image feature groups with four image features in each group are generated. In some embodiments, the image feature groups are generated using an iterative process, wherein the size of the sliding window is changed iteratively from an initial size of N to a final size smaller than N. In each iteration, the size of the sliding window may be decreased by 1 until a predefined size, such as 1, is reached. In the above example of N=4, the initial size of the sliding window would be 4. Then, in a subsequent iteration of generating image feature groups, the sliding window would be 3, etc. In the last iteration, the sliding window may be a predefined size smaller than N. In some cases this may even be 1, i.e. meaning that each image feature group only comprises one image feature. The above described method is useful for grouping image features having approximately the same depth. The sliding window approach may be done for each pattern feature, i.e. for each projector ray.

The generation of image feature groups may comprise the step of determining the standard deviation of the depths of the image features within each image feature group. The standard deviation may be assigned to each image feature group. Furthermore, a depth may be assigned to each image feature group, thus giving rise to a potential 3D point by projecting the projector ray out to that depth. This depth may be an average of the depths of the image features within the image feature group. Alternatively, the assigned depth may be chosen such that the sum of square of distances between the image features and the projection of the 3D point to the image planes, wherein said image features reside, is the smallest possible. Additionally, a number corresponding to the size of the sliding window used to generate the group, may be assigned to each group. Finally, a reliability score may be assigned to each image feature group, wherein the reliability score indicates how reliable the image feature group is considered. The reliability score preferably indicates how close the projector and camera rays pass to each other, wherein a high reliability score indicates that the camera rays pass very close to a given projector ray. The standard deviation and/or the size of the sliding window may be used to indicate how reliable that particular image feature group is considered. Alternatively, the sum of square of distances may be employed to assign a reliability score to the image feature group. As an example, image feature groups having four image features are generally considered more reliable than groups having only two image features. Accordingly, the standard deviation and/or the size of the sliding window may be used to determine the reliability score of each image feature group. Other parameters forming part of the reliability score may be envisioned. The image feature groups may be stored in a list. In some embodiments, the list of image feature groups is sorted according to the standard deviation and/or the reliability score of the groups.

The determined image feature groups should not be considered as the final solution to the correspondence problem. Rather, the groups (or list of groups) may be considered as candidates to a solution to the problem, wherein some candidates are considered more promising (i.e. more likely to be the true, ideal solution) than other, which is reflected by their reliability score. The most promising image feature group, i.e. the group having the highest reliability score is also denoted herein as a pre-seed, provided the group comprises N image features, where N denotes the number of cameras in the scanning device used to obtain the images. A high reliability score corresponds to a low standard deviation of the depths in the group, i.e. the image features in the group have approximately the same depth. A high reliability score also corresponds to a size of the sliding window of N. Accordingly, the reliability score may be an aggregate score formed by taking any of the following measures into account: the standard deviation, the sum of square of distances, the size of the sliding window, and/or combinations thereof, or other suitable measures. The image feature groups may be sorted lexicographically, i.e. such that all N-cam groups (image feature groups comprising N image features) are sorted according to reliability score, the (N−1)-cam groups are similarly sorted, and so on. There can only be one pre-seed for each pattern feature/projector ray, however, it may also be the case that there is no pre-seed determined for a given pattern feature. This may be the case if some image features are only verified by n cameras, where n is less than the total number of cameras, N.

Generating Seed Proposals

In accordance with preferred embodiments, the method comprises the step of generating one or more seed proposals. Each seed proposal preferably comprises at least a predefined number of image feature groups, such as at least 10 image feature groups, or at least 15 image feature groups, or at least 20 image feature groups. In some embodiments, the predefined number of image feature groups in a seed proposal is 15, such that each seed proposal comprises at least 15 image feature groups.

A seed proposal may be understood as a collection of image feature groups, wherein each image feature group comprises at least one image feature. At least one attribute of an image feature group may be a point in 3D space, e.g. described by a set of Cartesian coordinates (x, y, z), wherein z denotes the aforementioned depth assigned to the image feature group. The image feature groups may preferably comprise more attributes such as: projector ray index, and/or the indices of the individual image features within the group. The projector ray index may be understood as an index denoting which projector ray is associated to the image feature group. In more general terms, a seed proposal may be understood to be a set of data points in space, such as a point cloud. The presently disclosed method provides a framework for generating a digital representation of a 3D object by continuously generating and adding seed proposals to the representation (initially, i.e. before any seed proposal (s) are added, the representation may be empty).

To generate a seed proposal, one or more image feature groups are added incrementally to the proposal, preferably starting from a pre-seed. In preferred embodiments of the method, only image feature groups meeting one or more predefined first criteria are added to the proposal.

The step of adding a feature group to a seed proposal may comprise a check relating the neighborhood information on the image feature level to the neighborhood information on the pattern feature level. More precisely, if a feature group corresponding to a given pattern feature has already been added to the seed proposal, when considering whether to add a feature group corresponding to a neighboring pattern feature, the image features of the candidate image feature group should be the corresponding neighbors of the given image feature group in the neighborhood graph. In other words, if the candidate image feature group is the neighbor of the original image feature group with a given index, the image features in the original image feature group should have the features of the candidate image feature group as their neighbors with that index.

As an example, the one or more predefined first criteria may comprise a criterium that the standard deviation of a given image feature group has to be below a predefined threshold in order for the image feature group to be added to the seed proposal. As another example, the predefined first criteria may comprise a check similar to the one described in the foregoing paragraph. As yet another example, the reliability score of a given image feature group must be above a predefined value in order for the group to be added. Preferably, the image feature groups are added to the seed proposal(s) in prioritized order according to their reliability score provided the one or more predefined first criteria are met.

The following paragraph provides an example of how to generate a seed proposal. First, a pre-seed associated with a given pattern feature in the projector plane is added to a queue. The pre-seed may constitute the first image feature group (3D point) in the seed proposal. The pre-seed is generally surrounded by a plurality of neighboring image feature groups corresponding to the neighbors in the projector pattern, typically eight in the case of a checkerboard pattern. A neighboring image feature group is also referred to as a 'neighbor' in the following. The number of neighbors may be lower near the edges of the image(s) or in regions where the projected illumination pattern does not hit the surface of the 3D object. As a next step, a feature group may be taken out of the queue and added to the seed proposal. Once a feature group is removed from the queue, all of its neighbors are preferably evaluated to determine whether any of them should be added to the queue. The process of taking one image feature group out of the queue and possibly adding one or more new image feature groups to the queue may be performed iteratively until the queue is empty.

The purpose of the evaluation is to assess whether a given image feature group (e.g. a neighbor to the pre-seed) should be added to the queue or not. For each neighbor, it may be determined if the reliability score exceeds a certain predefined threshold. If it does it is preferably added to the queue. If not, the next neighbor is preferably considered. It may also be determined whether the image feature group under evaluation has the correct property, e.g. the correct phase. Furthermore, it may be checked whether all the image features of a given image feature group have the correct neighbors in each of their associated neighborhood graphs. Image feature groups are preferably added to the queue as long as the one or more predefined first criteria are met. Preferably, the image feature groups are taken out of the queue in prioritized order according to their reliability score, such that the most reliable image feature groups are evaluated before less reliable image feature groups.

Hence, the queue preferably constitutes a priority queue, wherein the reliability score is the priority. In the case of a checkerboard pattern, a maximum of eight image feature groups (the number of neighbors for a given image feature) can be added to the queue per considered pre-seed/projector ray. However, preferably only one image feature group can be taken out of the queue in a single step. Accordingly, image feature groups are removed from the queue and added to a given seed proposal in a prioritized order.

Once the queue is empty, it is evaluated whether the seed proposal comprises at least a predefined number of image feature groups. The seed proposal may comprise more groups than the predefined number, however, in preferred embodiments it needs to comprise at least the predefined number. If the seed proposal comprises less image feature groups than this number, the seed proposal is preferably rejected, and the image feature groups may then form part of other seed proposals. If the seed proposal comprises at least the predefined number, the seed proposal is accepted. Preferably, the image feature groups forming part of the stored seed proposal are marked as used. The outlined approach may then be repeated for all projector rays, whereby potentially a plurality of seed proposals are generated. The plurality of seed proposals may also be referred to as a collection of seed proposals. Previously processed/evaluated projector rays are preferably marked such that in subsequent step(s), such marked projector rays do not need to be re-evaluated. It should be noted that the above described method of generating a seed proposal is preferably repeated using a different set of criteria in one or more subsequent passes. Said different set of criteria is preferably less stringent than the first set of criteria. As an example, the size, n, of each image feature group (i.e. the amount of image features inside a group) may be less than N in such a second pass of the generation of seed proposals, where N denotes the number of cameras. Hence, the method of generating seed proposals may be repeated iteratively, where n is decreased iteratively by 1 between each iteration. In the subsequent passes, accepted seed proposals may be allowed to merge with each other and/or new seed proposal(s) may be allowed to merge with accepted seed proposal(s). It may further be allowed to grow accepted seed proposals under more relaxed criteria. The term 'grow' may be understood as increasing the number of image feature groups in a given seed proposal.

Accordingly, the method may comprise the step of generating one or more seed proposals, wherein the generation of each seed proposal comprises the steps of:

i. adding one or more image feature groups to a seed
proposal based on one or more predefined first criteria;
and ii. accepting seed proposal(s) comprising at least the
predefined number of image feature groups.

Generating the Digital Representation

A final step of the disclosed method is to generate a digital
representation of the 3D object by adding one or more seed
proposal(s) to the digital representation. In preferred
embodiments, the seed proposal(s) are added based on one
or more predefined second criteria. In some embodiments,
the second criteria comprise a criterium that the seed pro-
posal should comprise at least a predefined amount of image
features, which are not marked, in order for the seed
proposal to be added to the digital representation.

The digital representation may initially be empty, i.e.
without comprising any information. The digital represen-
tation may then be built by adding one or more seed
proposals from the collection of seed proposals previously
generated to the (initially empty) representation. Preferably,
seed proposals comprising the highest number of image
feature groups are considered/added before seed proposals
comprising less image feature groups. Accordingly, the seed
proposal(s) may be added to the digital representation in
prioritized order according to the amount of image feature
groups in each seed proposal. Preferably, once a seed
proposal has been added to the representation, its image
feature groups are marked as in use. Preferably, subse-
quently considered seed proposals comprise no marked
image feature groups. However, in some embodiments, there
may be an overlap of image feature groups, such that some
image feature groups belong to more than one seed proposal.
Therefore, in some embodiments, each seed proposal should
comprise at least a predefined amount of image features,
which are not marked, in order for the seed proposal to be
added to the digital representation. As soon as at least one
seed proposal is added, e.g. to an initial empty representation
or to a pre-seed, the digital representation is generated.
Subsequently, further seed proposals may be added to the
representation, whereby the amount of data (image feature
groups) forming part of the representation is increased. The
digital representation may be provided in the form of one or
more point clouds.

DETAILED DESCRIPTION OF THE DRAWINGS

FIG. 1 shows a flowchart of an embodiment of the
presently disclosed method. The first step 101 of the method
is to receive or acquire images of a three-dimensional (3D)
object. The images may be acquired/provided by a scanning
device such as an intraoral 3D scanning device. The images
may be acquired by projecting a predefined pattern onto a
surface of the 3D object, wherein the pattern comprises a
plurality of pattern features, such as corners in a checker-
board pattern. The acquired images will similarly comprise
a plurality of image features. In step 102, said image features
are determined. The image features may be determined
automatically by a neural network trained to determine the
image features. The neural network may be implemented on
a neural processor, also referred to as a neural processing
unit (NPU). The NPU may be located on the scanning
device. The neural network may be further configured to
output further properties of the pattern, such as a phase
associated with each image feature. In step 103, the depth(s)
of each image feature are determined using triangulation. As
an example, in case an image feature is associated with five
pattern features, i.e. in case the camera ray corresponding to said image feature intersects five different projector rays
within a predefined tolerance, then five possible depths are
assigned to that image feature. Each depth is measured along
a projector ray from the projector plane to the intersection.
In step 104, image feature groups (3D points) are generated
by grouping image features in groups having a predeter-
mined size, wherein each image feature within a group has
a unique camera index. In other words, image features
within such a group originates from different images
acquired by different cameras. The image feature groups are
preferably generated in an iterative approach, wherein a
sliding window is applied to the ordered list of image
features. The size of the sliding window may be decreased
between each iteration, such that the size of the generated
image feature groups similarly decreases between each
iteration. Furthermore, a reliability score may be assigned to
each image feature group. The reliability score is a measure
of how close the camera rays of the image features within
the group passes to the projector ray associated with that
image feature group. In step 105, seed proposal(s) are
generated. A seed proposal is a collection of image feature
groups. When generating a seed proposal, it is evaluated
whether a given image feature group should be added to a
queue or not based on predefined criteria. The queue is a
priority queue, wherein the priority is the reliability score.
As a starting point, a pre-seed is added to the queue and then
the neighboring image feature points to that pre-seed is
evaluated. Any neighbors fulfilling the predefined criteria
are then added to the queue. In general, many image feature
groups may be added to the queue, but preferably only one
may be removed from the queue at a given instance. Once
image feature groups are added to the queue, the image
feature group having the highest priority, i.e. highest reli-
ability score, is removed from the queue and added to the
seed proposal. The neighbors of the image feature group
which was most recently removed from the queue are then
evaluated and possibly added to the queue. This may then
continue until the queue is empty. In general, the image
feature groups are taken out of the queue one by one
according to their priority/reliability score. However, each
time an image feature group is removed from the queue and
added to the seed proposal, the neighbors of that image
feature group is evaluated according to the criteria, and
possibly added to the queue. Once the queue is empty, it is
evaluated whether the number of image feature groups in the
seed proposal exceeds a predefined lower limit. In case the
seed proposal comprises at least this minimum amount of
image feature groups, the seed proposal is stored. More seed
proposals may be generated according to the outlined pro-
cedure, and some of the predefined criteria may be relaxed
in subsequent generations of seed proposals. Thereby, col-
lections of seed proposals may be generated and stored. In
step 106, a digital representation is generated based on the
seed proposal(s). The digital representation may be gener-
ated by adding seed proposal(s) to an initially empty repre-
sentation. Preferably, the seed proposals are added to the
representation in a prioritized order according to the size of
the seed proposal, i.e. according to the number of image
feature groups within a seed proposal.

Each seed proposal comprises a set of 3D points in space.
Consequently, the digital representation similarly comprises
a set of 3D points, such as in the form of a point cloud. In
subsequent method steps, a 3D surface model may be
constructed based on the point cloud.

Figure 2:
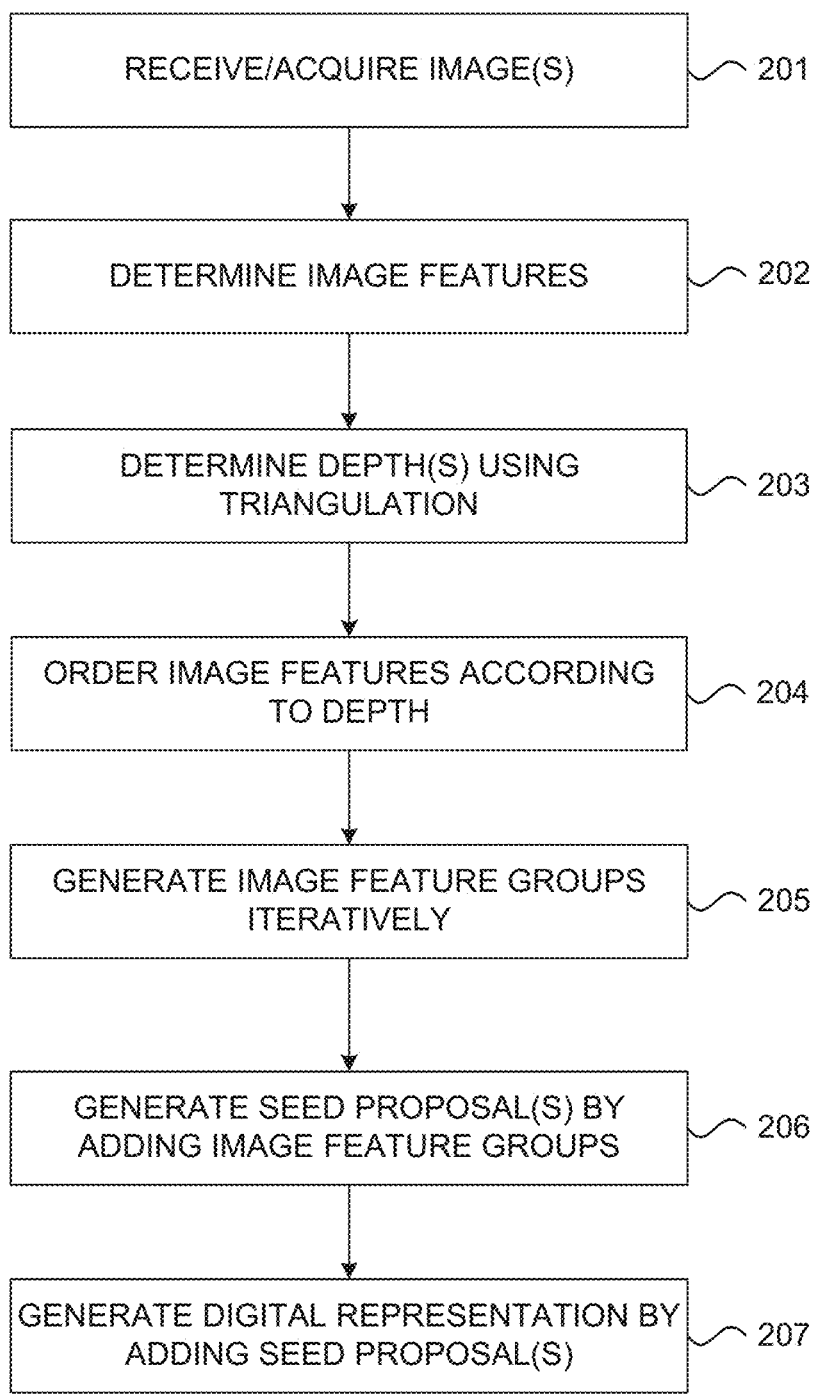
FIG. 2 shows a flowchart of the disclosed method according to an embodiment, wherein the method is more detailed than the one described in relation to FIG. 1.

FIG. 2 shows a flowchart of an embodiment of the
presently disclosed method. The steps 201-203 are similar to
the steps 101-103 described in relation to FIG. 1. In this embodiment, the method further comprises a step 204, wherein the image features within a given projector ray, i.e. all the image features associated to a given pattern feature, are ordered according to depth. This may be done for all pattern features, whereby an ordered list of image features is generated for each pattern feature. Steps 205-207 are similar to the steps 104-106 described in relation to FIG. 1.

FIG. 3 shows a flowchart of an embodiment of the presently disclosed method. The steps 301-302 are similar to the steps 101-102 described in relation to FIG. 1. In this embodiment, the method further comprises a step 303, wherein a neighborhood graph is generated for each image based on the image features and the phases. The neighborhood graph may be provided as a 2D map displaying information such as the position(s) of the image features, the connectivity of the image features (i.e. the relations between the image features), the phase of the image features, or combinations thereof. The method further comprises a step 304, wherein image features are associated with pattern features or vice versa. This may be achieved by projecting lines in 3D (projector rays, camera rays) onto 2D planes (image planes, projector planes), whereby curves are obtained. As an example, for a given projector ray (line in 3D) projected to an image plane, at each instance that the projected ray passes close to an image feature in that image plane, e.g. within a predetermined distance, the pattern feature corresponding to said projector ray is associated with said image feature. Conversely, for a given camera ray (line in 3D) projected to a projector plane, at each instance wherein said projected camera ray passes close to a pattern feature, the image feature corresponding to said camera ray is associated with said pattern feature. It is thereby possible to associate each image feature with a number of different pattern features/projector rays. Accordingly, several depths may be assigned to the same image feature. Step 305 is similar to step 103 described in relation to FIG. 1. Step 306 is similar to step 204 described in relation to FIG. 2. Steps 307-308 are similar to the steps 104-106 described in relation to FIG. 1.

Figure 4:
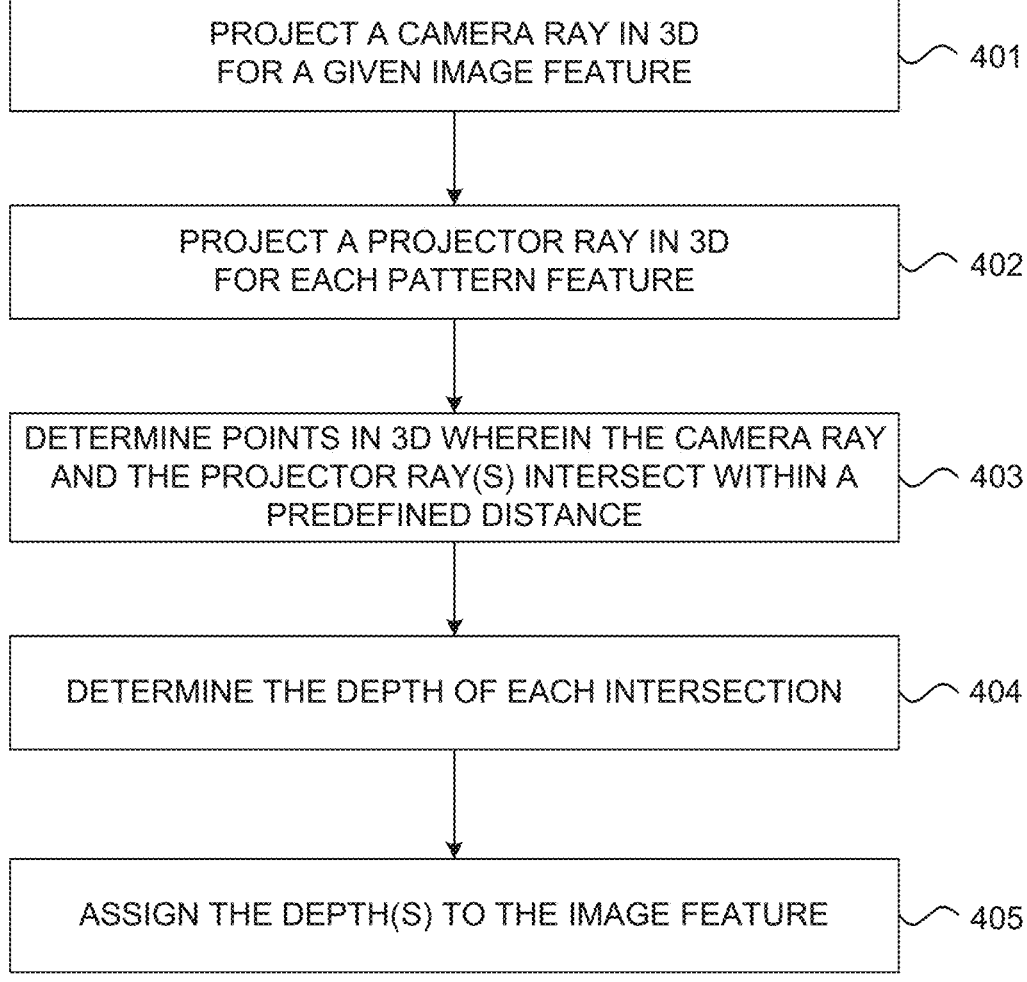
FIG. 4 shows a flowchart of an example of how to determine the depths of image features according to an embodiment of the presently disclosed method.

FIG. 4 shows a flowchart illustrating how to determine the possible depths of a given image feature according to the disclosed method. In step 401, a camera ray corresponding to the image feature is projected in 3D, i.e. emanating from said image feature. In step 402, a projector ray is projected in 3D for each pattern feature, such that each projector ray emanates from a pattern feature. In step 403, points in 3D are determined, wherein the camera ray and the projector ray(s) intersect within a predefined distance. In step 404, the depth of each intersection is determined by measuring the distance from the projector plane along each of the projector rays intersecting the camera ray. In step 405, the depth(s) are assigned to the image feature. Accordingly, several depths may be assigned to an image feature (one for each intersection). It should be noted that at this point/step in the method, the correspondence problem is not solved yet. Therefore, it is not known which of the assigned depths is the true solution to the correspondence problem. The steps 401-405 may be repeated for all image features in all images.

Figure 5:
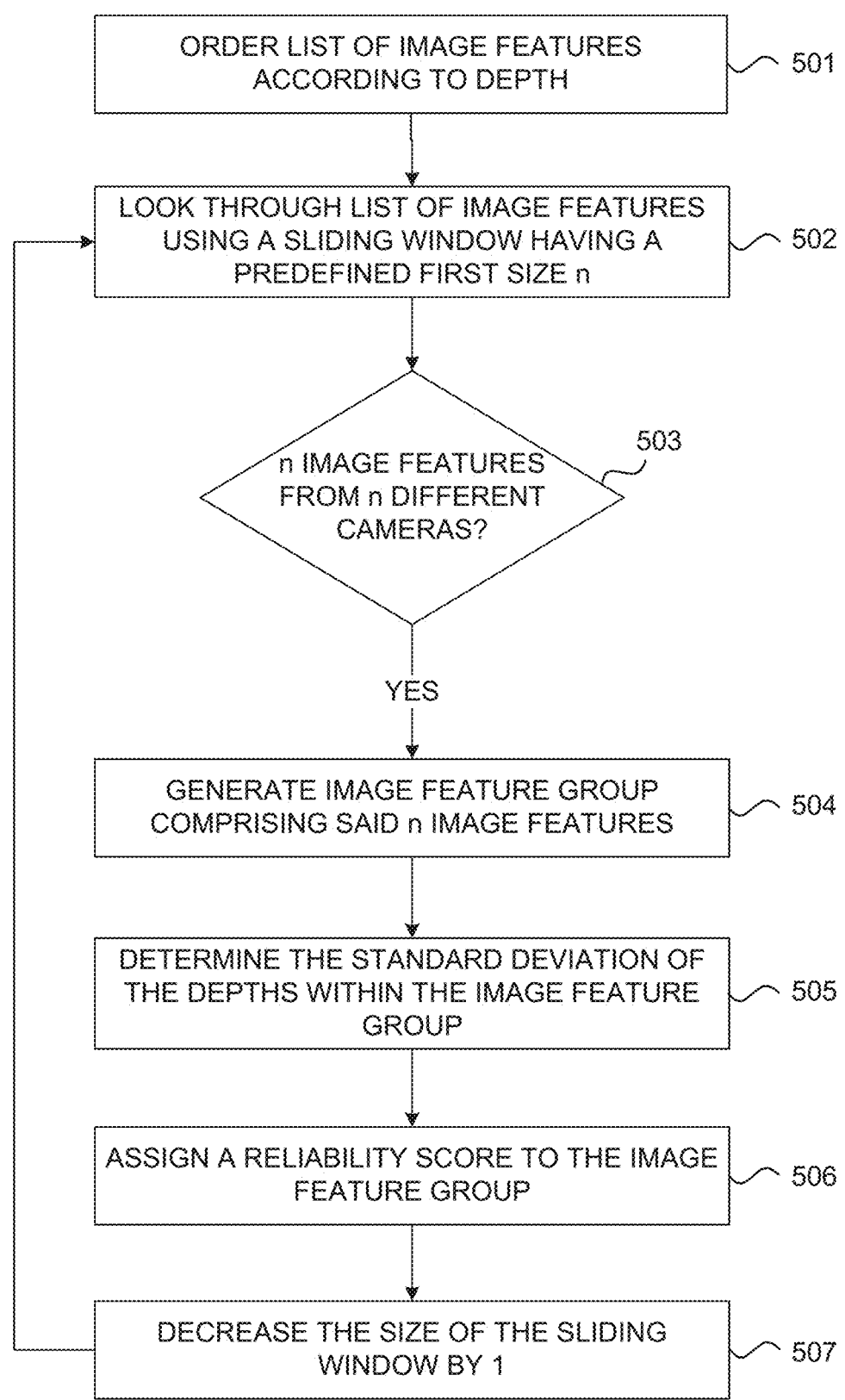
FIG. 5 shows a flowchart of an example of how to generate image feature groups according to an embodiment of the presently disclosed method.

FIG. 5 shows a flowchart illustrating how to generate image feature groups according to the disclosed method. In step 501, the image features associated with a given pattern feature are ordered/sorted according to depth. It should be noted that within a given projector ray corresponding to a pattern feature, each image feature can only have one depth. The reason why an image feature may have several depths assigned, is that the image feature can be assigned to several different pattern features. Therefore, there is no ambiguity when ordering the image features associated with a given pattern feature according to depth. Then in step 502, a sliding window technique is employed to look through the ordered list of image features within a given projector ray/pattern feature. The sliding window has a predefined first size, n. In step 503, it is evaluated whether there are n image features from n different cameras within the sliding window. If this is the case, an image feature group is generated comprising said n image features. In step 505, the standard deviation of the depths within the image feature group is determined. In step 506, a reliability score is assigned to the image feature group. The standard deviation and/or the size of the sliding window may be used to determine the reliability score. However, other parameters to determine the score may be envisioned. In general, the reliability score should reflect how likely it is that the given image feature group (3D point) forms part of the correct solution to the correspondence problem. In step 507, the size of the sliding window is decreased by 1, such that it has a size of n−1. Then, steps 502-507 may be repeated until the sliding window reaches a predefined second size, such as 1. Hence, the image feature groups may be generated using an iterative approach, wherein the size of the sliding window is decreased by 1 in each iteration.

Figure 6:
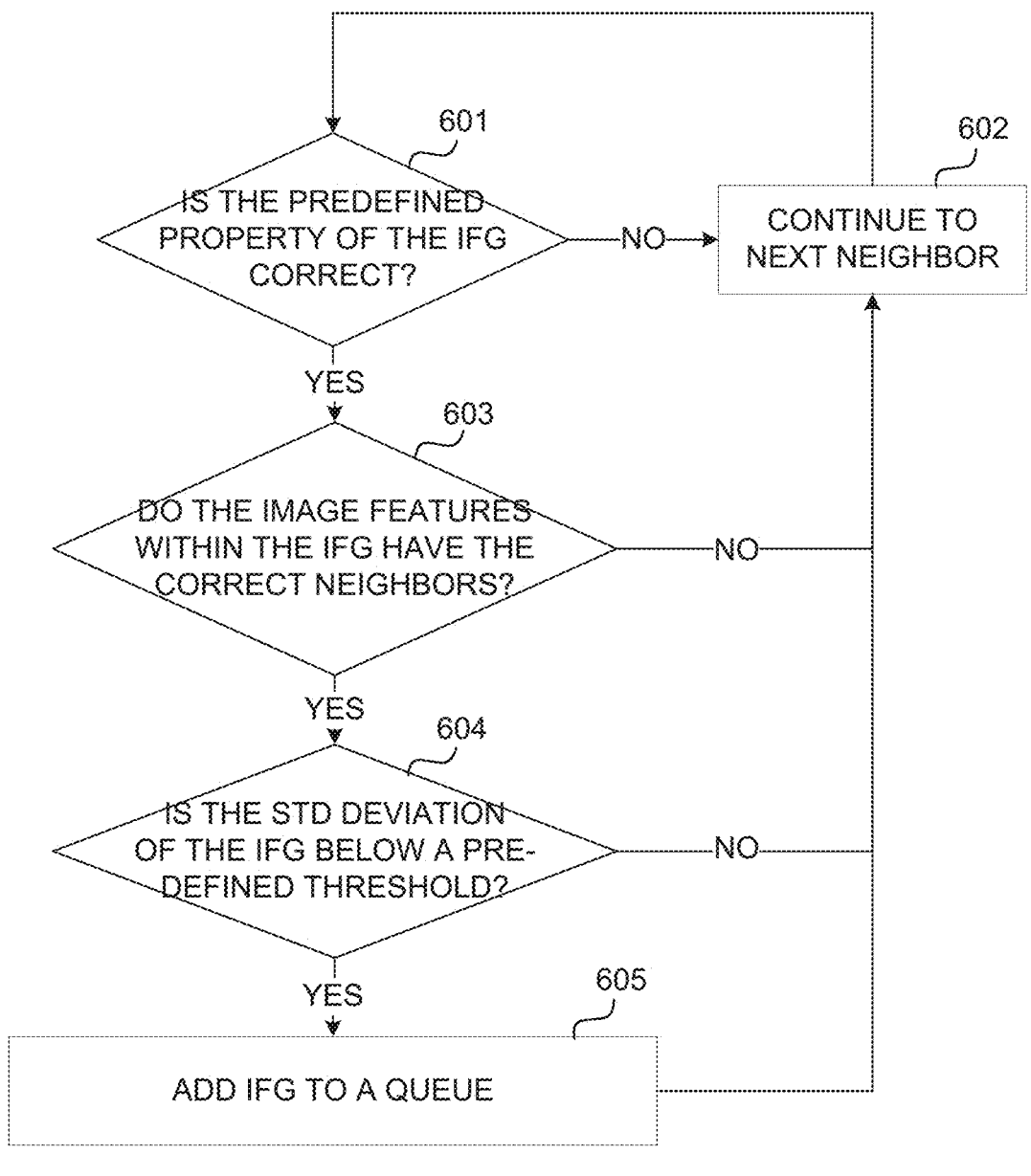
FIG. 6 shows a flowchart of an example of how to evaluate image feature groups according to predefined criteria and possibly add one or more to a queue.

FIG. 6 shows a flowchart illustrating how to evaluate whether a given image feature group should be added to a priority queue. In step 601, it is evaluated whether the predefined property, such as the phase, of the image feature group is correct. If it has the wrong phase, the image feature group is ignored and then one of the neighboring image feature groups is considered in step 602. If the predefined property is correct, then in step 603 it is evaluated whether the image features within the group have the correct neighbors. This may be determined by consulting the neighborhood graph of each image feature. If this criterium is met, it may be evaluated whether the standard deviation of the image feature group is below a predefined threshold in step 604. If all the criteria (601, 603, 604) are met, the group may be added to the priority queue in step 605. After adding a group, the method may continue by evaluating a next neighbor until all neighbors of the given image feature group considered to begin with have been evaluated.

Figure 7:
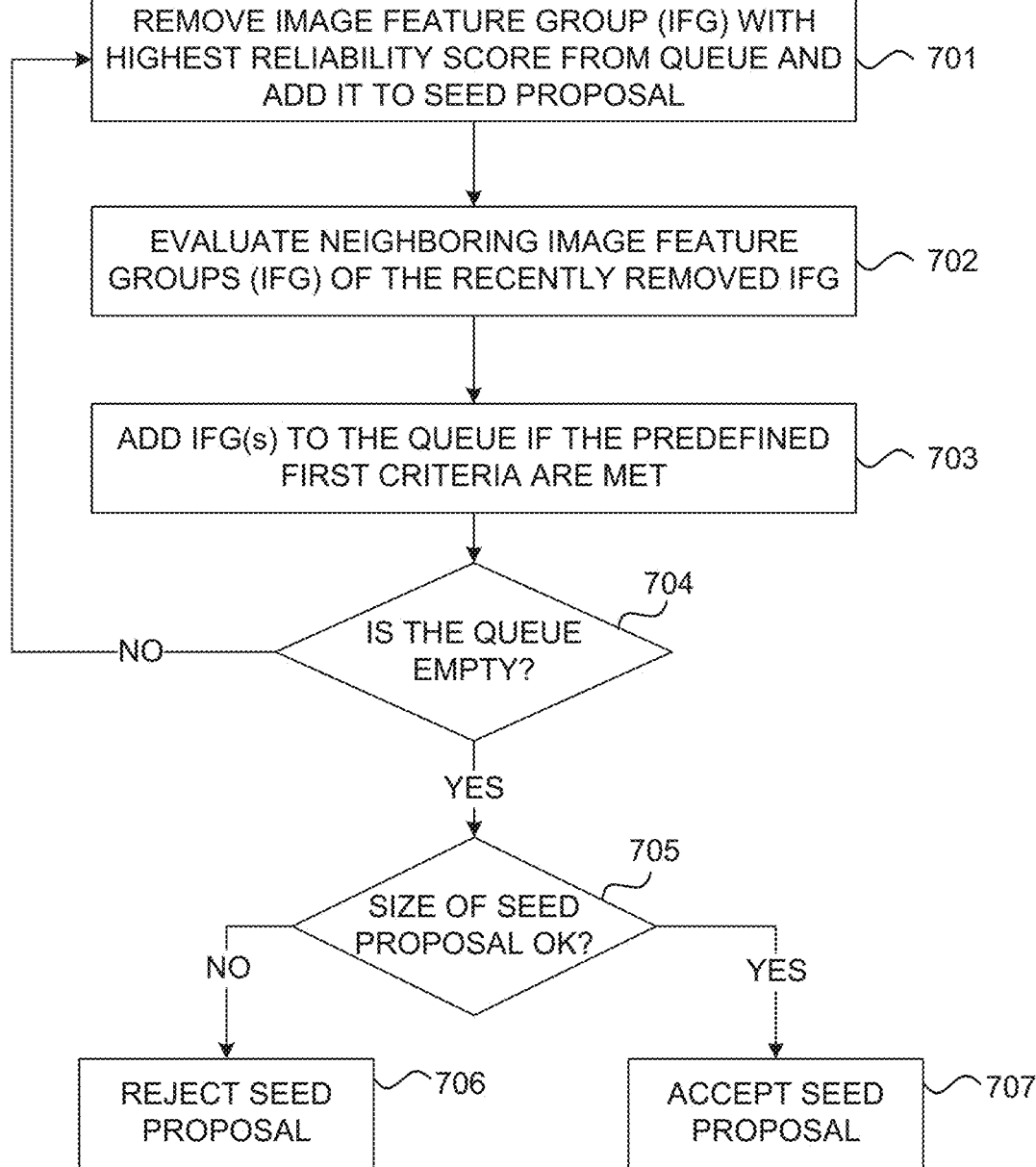
FIG. 7 shows a flowchart of another example of how to generate a seed proposal according to an embodiment of the presently disclosed method.

FIG. 7 shows a flowchart illustrating how image feature groups may be removed from the queue and added to a seed proposal. The priority queue may comprise many image feature groups, each having a reliability score. The group having the highest score is prioritized over groups having a lower score. In step 701, the image feature group having the highest reliability score is taken out of the queue and added to a seed proposal. In step 702, the neighbors of the image feature group, which was most recently removed from the queue, are evaluated. Preferably, only neighbors that have not previously been evaluated are evaluated in step 702. Step 702 may then comprise the steps 601-604 listed in relation to FIG. 6. In step 703, any image feature groups fulfilling the predefined first criteria are added to the queue. The method may in some embodiments further feature the steps 704-707. In step 704, it is evaluated whether the queue is empty. If this is not the case, step 701-704 may be repeated until the queue is empty. Once empty, it may be evaluated in step 705 whether the size of the seed proposal is sufficient, e.g. whether the number of image feature groups within the seed proposal equals or exceeds a predefined number. In step 706, the seed proposal may be rejected if the size is smaller than the predefined number. In step 707, the seed proposal may be accepted if the seed proposal comprises at least the predefined number of image feature groups.

Figure 8:
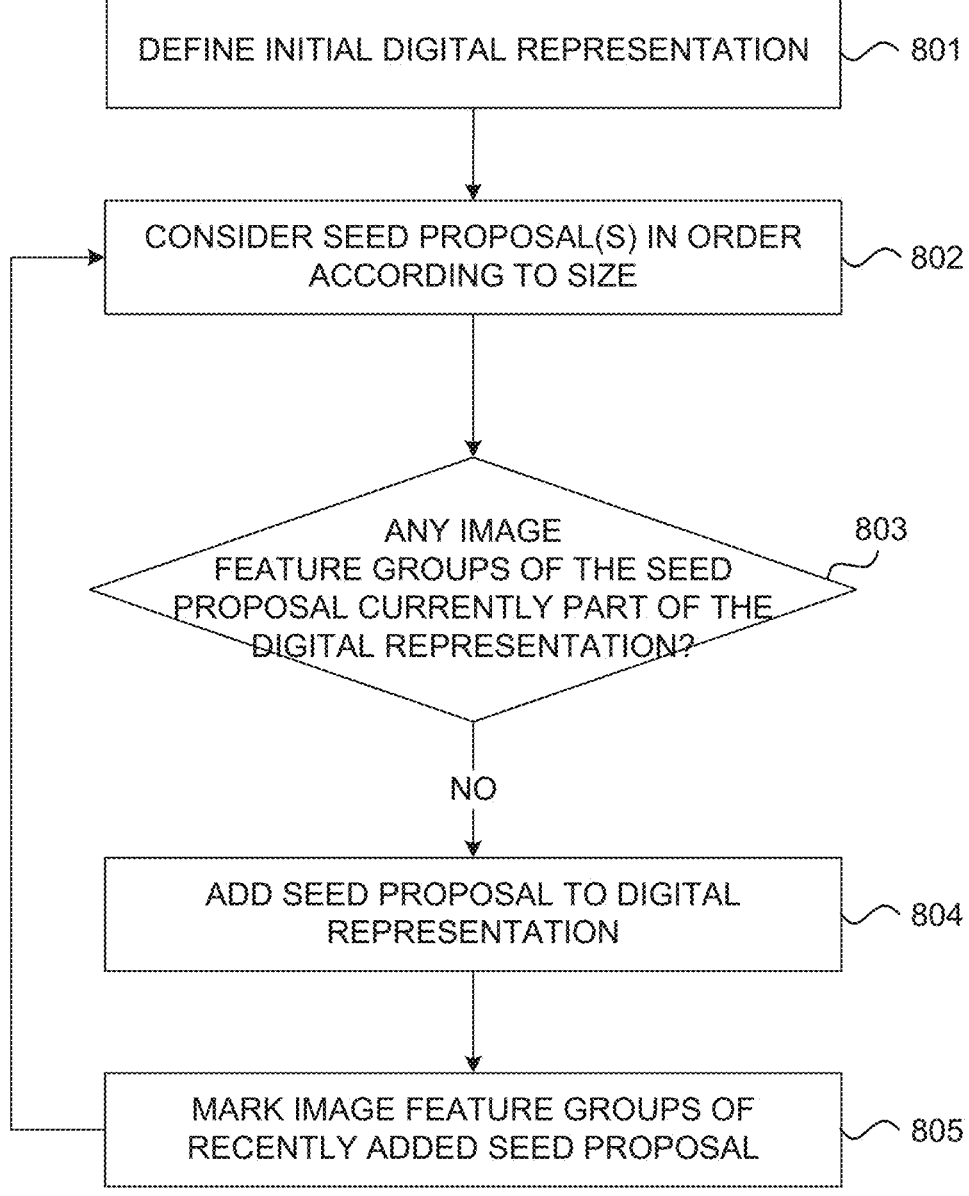
FIG. 8 shows a flowchart of an example of how to generate a digital representation according to an embodiment of the presently disclosed method.

FIG. 8 shows a flowchart illustrating how the digital representation may be generated based on seed proposals. In step 801, an initial digital representation is defined, which may be empty. In step 802, seed proposal(s) are considered in order according to their size, i.e. the number of image feature groups within the seed proposal. Accordingly, seed proposal(s) with many image feature groups are prioritized over seed proposal(s) having less. In step 803, it is evaluated whether any image feature groups of the seed proposal are currently part of the digital representation. If this is not the case, the seed proposal is added to the digital representation in step 804. In step 805, image feature groups belonging to recently added seed proposal(s) may be marked. It should be noted that the steps 801-805 only form an embodiment/example of how to generate the digital representation based on seed proposal(s). As another example, steps 803 and 805 are not necessarily performed, whereby the representation is generated by adding one or more seed proposal(s) in order according to their size. In yet another example, only steps 801 and 804 are performed, such that the representation is simply generated by adding the previously generated seed proposal(s).

Figure 9:
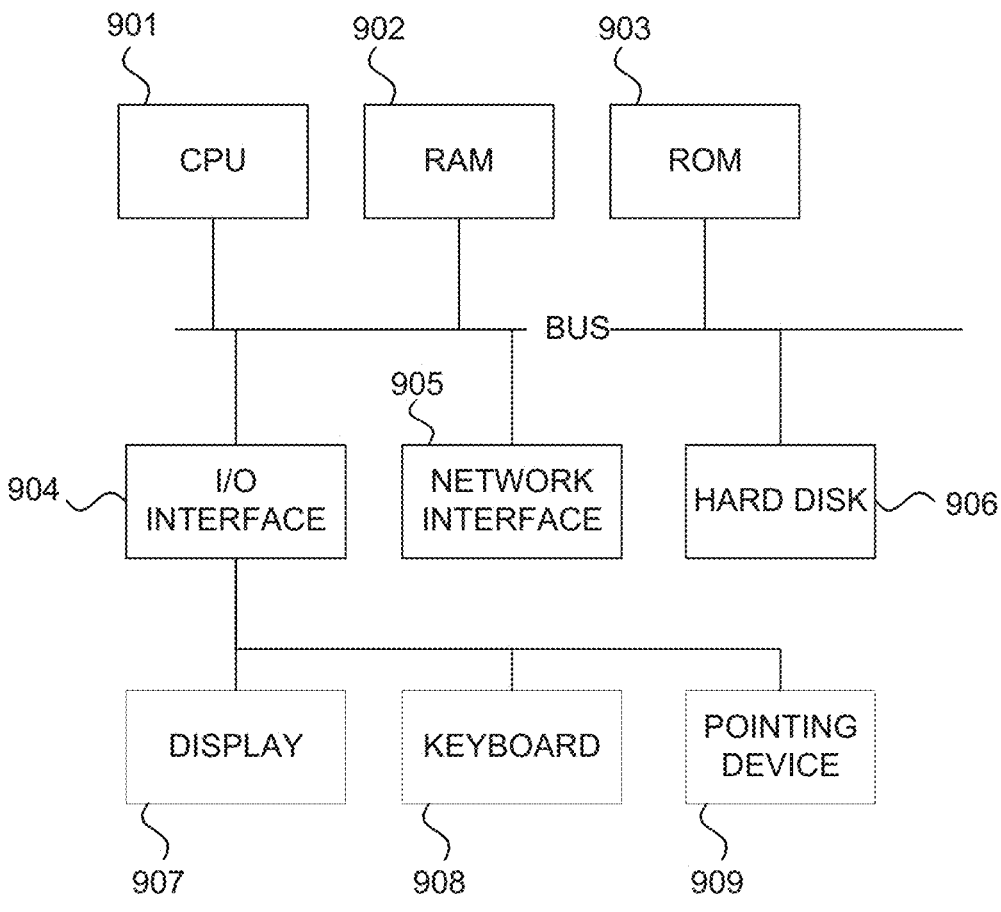
FIG. 9 shows a schematic of a computer system.

FIG. 9 shows a schematic of a computer system. The computer system may comprise a central processing unit (CPU) 901, which is configured to read and execute instructions stored in a computer memory, which may take the form of volatile memory such as random-access memory (RAM) 902. The computer memory stores instructions for execution by the CPU and data used by those instructions. For example, the instructions may relate to the methods disclosed herein. The computer may further comprise non-volatile storage, e.g. in the form of a hard disk 906. The computer further comprises an I/O interface 904 to which other devices may be connected. Such devices may include display(s) 907, keyboard(s) 908, and pointing device(s) 909 e.g. a mouse. The display 907 may be configured to display a 2D rendition of the digital representation of the dental object. A user may interact with the computer system via a keyboard 908 and/or a mouse 909. A network interface 905 allows the computer system to be connected to an appropriate computer network so as to receive and transmit data from and to other computing devices. The CPU, computer memory (RAM/ROM), hard disk, I/O interface, and network interface may be connected by a bus.

Figure 10:
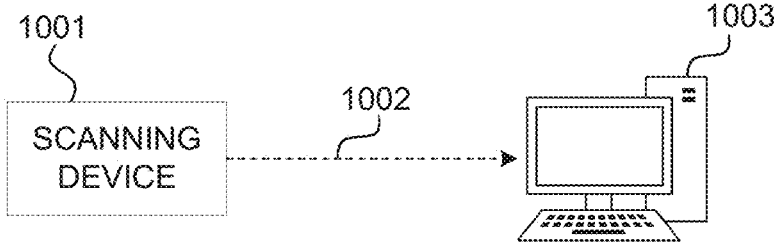
FIG. 10 shows an embodiment of a dental scanning system comprising a scanning device and a computer system.

FIG. 10 shows an embodiment of a dental scanning system according to the present disclosure. The dental scanning system may comprise a scanning device 1001, such as an intraoral 3D scanning device. The system may further comprise a computer system 1003 as described in relation to FIG. 9. The scanning device 1001 may provide scan data 1002, such as images or point clouds, to the computer system 1003, which may be configured to generate a digital 3D surface model based on the scan data. The scanning device may comprise one or more projector units configured for projecting a predefined pattern onto the 3D object, wherein each projector unit is associated with a projector plane; and one or more cameras for each projector unit, wherein each camera is configured for acquiring images of at least a part of the 3D object. The scanning device may further comprise one or more processors configured for carrying out any of the methods disclosed herein. In some embodiments, the dental scanning system only comprises the scanning device 1001.

Figure 11:
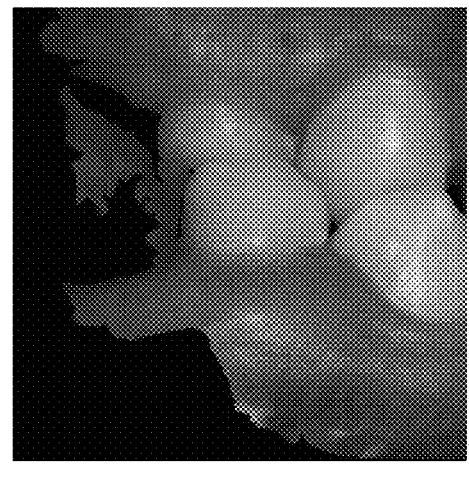
FIG. 11 shows an example of input data to the neural network described herein.

FIG. 11 shows a rendered image of a 3D object, here some teeth of a subject. An illumination pattern (here a checkerboard pattern) is visible in the image. Such an image is an example of a suitable image to be used as training input to the neural network described herein.

Figure 12:
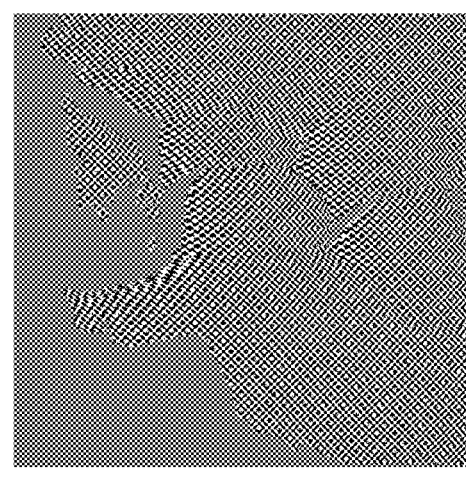
FIG. 12 shows an example of a first type of output from the neural network.

FIG. 12 shows an example of an output from the neural network. The output is here a checkerboard pattern, wherein a plurality of checkers (black/white) have been identified by the neural network and classified as either black or white.

Figure 13:
FIG. 13 shows an example of a second type of output from the neural network.
Figure 14:
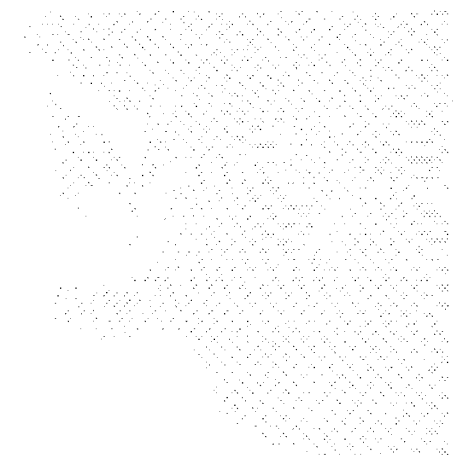
FIG. 14 shows an example of a third type of output from the neural network.

FIG. 13-14 show two maps of image features represented as points, wherein the image features correspond to corners in the checkerboard pattern shown in FIG. 12. In FIG. 13 the image features are of the type BW (Black-White-White-Black), whereas they are of the type WB (White-Black-Black-White) in FIG. 14. The two maps may be provided as an output from the neural network.

Figure 15:
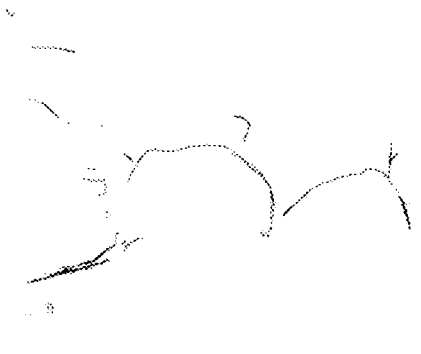
FIG. 15 shows an example of a fourth type of output from the neural network.

FIG. 15 shows another example of an output from the neural network. Here, the neural network has outputted an image displaying some boundaries identified by the network.

Figure 16:
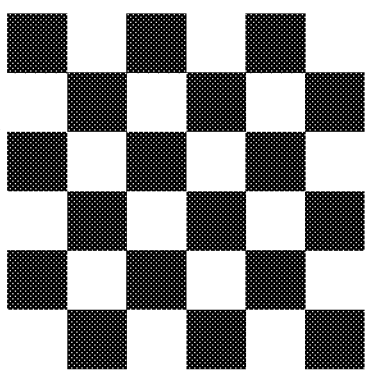
FIG. 16 shows an example of a polygonal pattern composed of checkers, thus forming a checkerboard pattern, each checker/square comprising four edges and four corners.

FIG. 16 shows an example of a polygonal pattern composed of checkers, thus forming a checkerboard pattern, each checker/square comprising four edges and four corners. This example of a checkerboard pattern comprises 6×6 checkers, thus a total of 36 checkers. However, in preferred embodiments wherein the light pattern is a checkerboard pattern, the checkerboard pattern may comprise many checkers such as at least 100×100 checkers.

Figure 17:
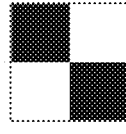
FIG. 17 shows an example of a repeating unit for the pattern shown in FIG. 16.

FIG. 17 shows an example of a repeating unit for the pattern shown in FIG. 16. Other examples of repeating units could be given. For this example, the repeating unit shown is repeated three times horizontally and three times vertically to form the pattern of FIG. 16.

Figure 18:
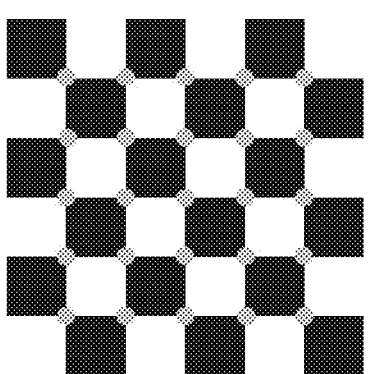
FIG. 18 shows an example of a checkerboard pattern, wherein pattern features are indicated as circles, said features corresponding to the inner corners in the pattern.

FIG. 18 shows an example of a checkerboard pattern, wherein pattern features are indicated on the figure as circles, said features corresponding to the inner corners in the pattern. The pattern features may correspond to all of the corners in the pattern, or they may correspond to the inner corners in the pattern as indicated in this figure.

Figure 19:
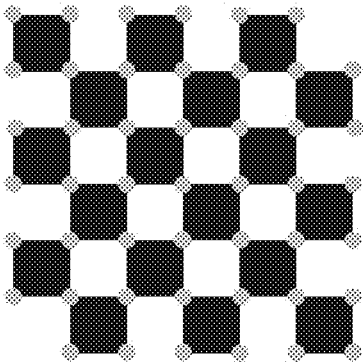
FIG. 19 shows an example of a checkerboard pattern, wherein pattern features are indicated as circles, said features corresponding to the corners in the pattern, wherein corners located on the outer boundary of the pattern are included.

FIG. 19 shows an example of a checkerboard pattern, wherein pattern features are indicated as circles, said features corresponding to the corners in the pattern, wherein corners located on the outer boundary of the pattern are included. In general, as the checkerboard pattern is expanded with more checkers, the difference between the number of inner corners and the number of total corners including those at the boundary will diminish.

Figure 20:
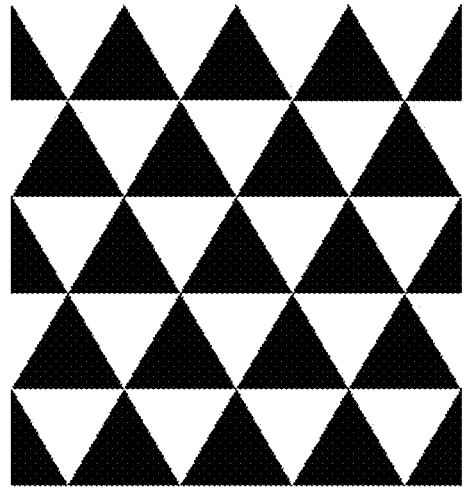
FIG. 20 shows an example of a polygonal pattern composed of triangles, each triangle comprising three edges and three corners.

FIG. 20 shows an example of a polygonal pattern composed of triangles, each triangle comprising three edges and three corners.

Figure 21:
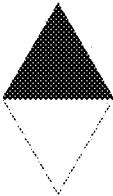
FIG. 21 shows an example of a repeating unit for the pattern shown in FIG. 20.

FIG. 21 shows an example of a repeating unit for the pattern shown in FIG. 20.

Figure 22:
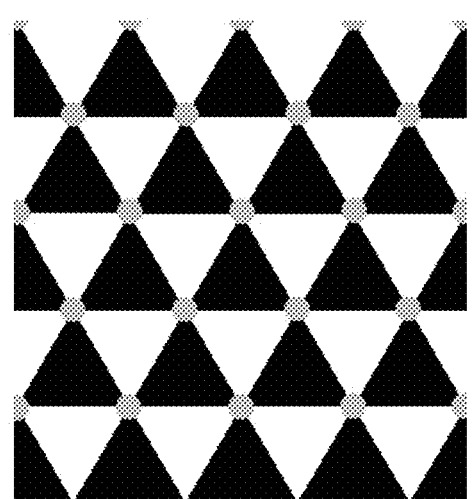
FIG. 22 shows an example of a polygonal pattern composed of triangles, wherein pattern features are indicated as circles, said features corresponding to the corners in the pattern.

FIG. 22 shows an example of a polygonal pattern composed of triangles, wherein pattern features are indicated as circles, said features corresponding to the corners in the pattern.

Figure 23:
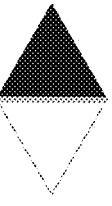
FIG. 23 shows an example of a repeating unit for the pattern shown in FIG. 22, wherein one of the edges have been highlighted.

FIG. 23 shows an example of a repeating unit for the pattern shown in FIG. 22, wherein one of the edges have been highlighted.

Figure 24:
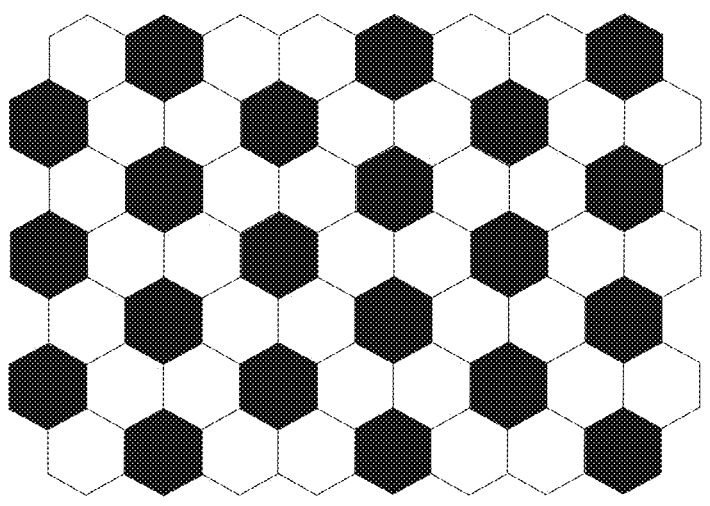
FIG. 24 shows an example of a polygonal pattern composed of hexagons, each hexagon comprising six edges and six corners.

FIG. 24 shows an example of a polygonal pattern composed of hexagons, each hexagon comprising six edges and six corners.

Figure 25:
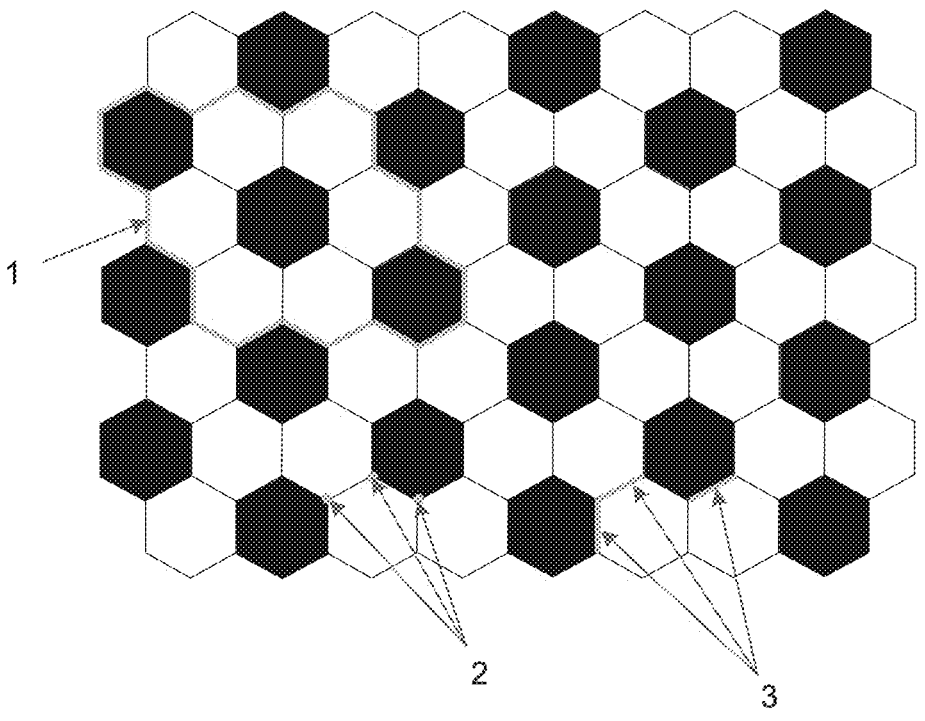
FIG. 25 shows the pattern of FIG. 24, wherein a repeating unit 1 has been indicated, along with some of the pattern features 2 and edges 3 of the pattern.

FIG. 25 shows the pattern of FIG. 24, wherein a repeating unit 1 has been indicated, along with some of the pattern features 2 and edges 3 of the pattern.

Figure 26:
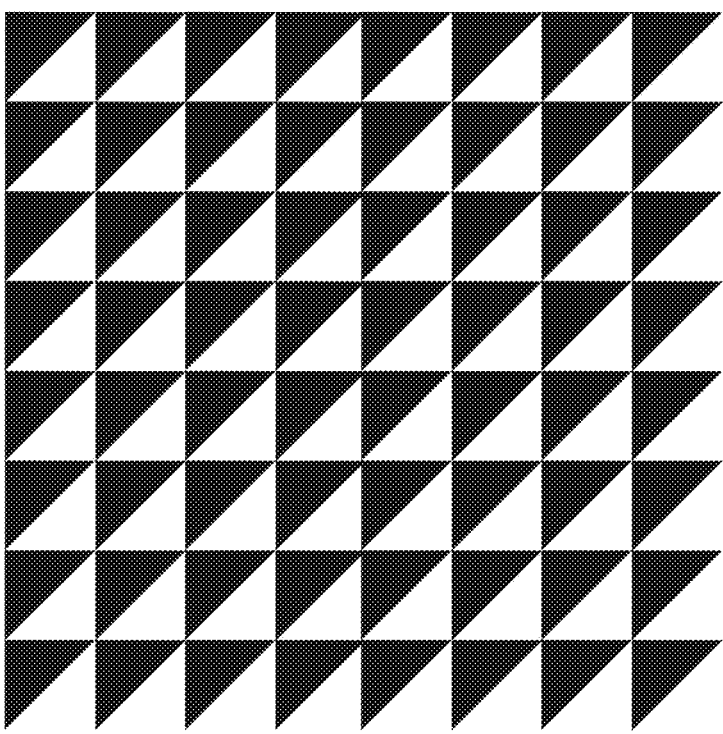
FIG. 26 shows an example of a polygonal pattern composed of triangles, each triangle comprising three edges and three corners.

FIG. 26 shows an example of a polygonal pattern composed of triangles, each triangle comprising three edges and three corners.

EXAMPLES

The following will provide an example of how the neural network can be trained to determine image features. As input, the network may be given an image of a scene illuminated with a given pattern with 3 color channels, i.e. a W×H×3 tensor with W being the width of the image and H the height of the image. As training input, the neural network may be given a rendering of a 3D object, such as a dental object. A suitable image for training purposes is illustrated in FIG. 10. The objective is for the neural network to deliver one or more types of data as output. Examples are given below:

a channel containing the likelihood that the pixel is in a part of the pattern with phase 0 (corresponding to a black checker);

a channel containing the likelihood that the pixel is in p part of the pattern with phase 1 (corresponding to a white pixel);

a channel containing the likelihood that the pixel is in the background such that no pattern is visible in the pixel (marked as grey in the output image);

a channel containing the likelihood that the pixel is part of an image feature of type BW (Black-White-White-Black);

a channel containing the likelihood that the pixel is part of an image feature of type WB (White-Black-Black-White);

a channel containing the likelihood that the pixel is not part of a feature; and a channel containing the likelihood that the pixel corresponds to a depth discontinuity (i.e., adjacent pixels have drastically different depths).

The neural network may be trained using supervised learning with a large number of input-output pairs, where an input-output pair is understood to be the aforementioned image (W×H×3 tensor) and at least one of the desired types of output data. Preferably, all 7 types of output data are used in each input-output pair during the supervised learning. As an example, a training dataset may comprise 15000 of such input-output pairs, but larger sets are likely to increase the performance and reliability of the network.

The training data may comprise rendered images of the 3D object, such as teeth. FIG. 10 shows an example of a suitable image for training purposes. The following data may be used to generate training data:

a reference 3D model of a jaw or part of a jaw;

a color map for the 3D model;

a trajectory that the scanning device moved along when capturing the reference scan;

the intrinsic parameters for the camera to be used to render the images; and the intrinsic parameters for the projector used to generate the pattern; and the relative positions of the cameras and the projector The above-mentioned training data may be given as input, which may be used to generate ground truth (desired output data) and input data for each pose along the trajectory by ray-tracing. FIGS. 11-14 show different types of output data. FIG. 11 shows a checkerboard pattern, wherein a plurality of checkers (black/white) have been identified by the neural network. FIG. 12-13 show two maps of image features represented as points, wherein the image features correspond to corners in the checkerboard pattern. In FIG. 12 the image features are of the type Black-White-White-Black, whereas they are of the type White-Black-Black-White in FIG. 13. FIG. 14 shows boundaries identified by the neural network.

An example of a suitable network architecture for the neural network is the Lite-HRNet architecture, as described in the article "Lite-HRNet: A Lightweight High-Resolution Network" by Changqian Yu et al. (accessible https://arxiv.org/abs/2104.06403).

List of Items

1. A method for generating a digital three-dimensional representation of a dental object, the method comprising the steps of:

projecting a pattern on a surface of the dental object using an intraoral scanning device;

acquiring one or more sets of images, wherein each set of images comprises at least two images, wherein each image includes at least a portion of the projected pattern;

determining one or more image features within each set of images;

solving a correspondence problem within each set of images using a triangulation method, such that points in 3D space are determined based on the image features, wherein said points form a solution to the correspondence problem, wherein the correspondence problem is solved for groups of pattern features and/or image features; and generating a digital three-dimensional representation of the dental object, wherein the solution to the correspondence problem is used to generate the three-dimensional representation.

2. The method according to item 1, wherein the pattern comprises a plurality of pattern features.

3. The method according to any of the preceding items, wherein the pattern features are arranged in a regular grid.

4. The method according to any of the preceding items, wherein the determination of image features is performed using a neural network.

5. The method according to item 4, wherein the neural network is a convolutional neural network.

6. The method according to any of the items 4-5, wherein the neural network is executed on a specialized hardware accelerator, which is located on the intraoral scanning device.

7. The method according to any of the items 4-6, wherein the neural network is executed on a neural processing unit (NPU), which is located on the intraoral scanning device.

8. The method according to any of the preceding items, wherein one or more steps of the method are performed continuously and/or in real-time.

9. The method according to any of the preceding items, wherein the pattern is a static pattern, i.e. a pattern that remains fixed in time.

10. The method according to any of the preceding items, wherein the images within a set of images are acquired simultaneously.

11. The method according to any of the preceding items, wherein the step of solving the correspondence problem comprises the steps of:

determining candidate points that potentially form a solution to the correspondence problem, wherein the candidate points are generated based on the determined image features;

attributing a reliability score to the candidate points, wherein the reliability score reflects how likely the candidate points are to be part of the solution.

12. The method according to item 10, wherein the reliability score is based on the number of cameras having observed the image features of which a given candidate point is based.

13. A computer-implemented method for generating a digital representation of a three-dimensional (3D) object, the method comprising the steps of:

acquiring and/or receiving two or more images of the 3D object, wherein each image comprises a plurality of image features;

determining the image features in each of the images;

determining one or more possible depth(s) associated with each image feature;

generating image feature groups, wherein each image feature group comprises one or more image features;

generating one or more seed proposals, wherein each seed proposal comprises at least a predefined number of image feature groups, wherein the generation of each seed proposal comprises the steps of:

adding one or more image feature groups to a seed proposal based on one or more predefined first criteria;

accepting seed proposal(s) comprising at least the predefined number of image feature groups; and generating a digital representation of the 3D object by adding seed proposal(s) to the digital representation based on one or more predefined second criteria.

14. The method according to any of the preceding items, wherein the image features are determined using a neural network.

15. The method according to item 4 or 14, wherein the neural network has been trained using a training dataset, the training dataset comprising digital renderings of dental objects based on existing 3D representations.

16. The method according to any of the preceding items, wherein the projected pattern is a checkerboard pattern comprising a plurality of checkers, wherein the corners of the checkers constitute the pattern features.

17. The method according to any of the preceding items, wherein the neural network has been trained using a training dataset, the training dataset comprising pixel level annotations classifying pixels into black and white checkers.

18. The method according to any of the preceding items, wherein the neural network has been trained using a training dataset, the training dataset comprising pixel level annotations, said annotations including the location of pattern features.

19. The method according to any of the preceding items, wherein the neural network has been trained using a training dataset, the training dataset comprising a pixel level depth map of the corresponding 3D surface of the rendered 2D images.

20. The method according to item 4 or 14, wherein the neural network is executed on a neural processing unit (NPU).

21. The method according to item 4 or 14, wherein the neural network is executed on a graphics processing unit (GPU).

22. The method according to any of the preceding items, wherein the one or more possible depth(s) are determined using a triangulation method.

23. The method according to any of the preceding items, wherein the images are acquired by a scanning device comprising a projector unit and two or more cameras.

24. The method according to any of the preceding items, wherein the images are acquired by a scanning device comprising a projector unit and four or more cameras.

25. The method according to any of the items 13-24, wherein at least a first number of image(s) are obtained using a first camera and at least a second number of image(s) are obtained using a second camera.

26. The method according to any of the preceding items, wherein each image feature is associated with a set of image coordinates and a camera index indicating which camera acquired the image associated with the image feature.

27. The method according to item 26, wherein the step of determining image features includes determining the image coordinates and a camera index of each image feature.

28. The method according to any of the preceding items, wherein the method further comprises the step of assessing whether one or more of the determined image features should be rejected or not.

29. The method according to any of the preceding items, wherein image features within an image feature group each has a unique camera index.

30. The method according to any of the preceding items, wherein the method further comprises the step of associating zero or more image features, such as one or more image features, to each pattern feature.

31. The method according to any of the preceding items, wherein the method further comprises the step of ordering the determined image features associated with a given pattern feature according to depth prior to the generation of image feature groups.

32. The method according to any of the preceding items, wherein the image feature groups are generated using a sliding window approach, wherein a sliding window of a predetermined size is used to group image features having approximately the same depth.

33. The method according to item 32, wherein the number of cameras is denoted N, and wherein the image feature groups are generated using an iterative process wherein the size of the sliding window is changed iteratively from an initial size of N to a final size smaller than N.

34. The method according to any of the preceding items, wherein the generation of image feature groups comprises the step of assigning a depth to each image feature group.

35. The method according to item 34, wherein the assigned depth is an average of the depths of the image features within the image feature group.

36. The method according to any of the preceding items, wherein a reliability score is assigned to each image feature group, wherein the reliability score indicates how reliable the image feature group is considered.

37. The method according to item 36, wherein the reliability score indicates how close the projector ray associated with the image feature group and the camera rays associated with the image features within said group pass to each other.

38. The method according to any of the preceding items, wherein the standard deviation of the depths of the image features within each image feature group is calculated and assigned to each image feature group.

39. The method according to any of the items 32-38, wherein the standard deviation and/or the size of the sliding window is used to determine the reliability score of each image feature group.

40. The method according to any of the items 32-39, wherein image feature groups are stored in a list, which is sorted according to the standard deviation or the reliability score.

41. The method according to any of the preceding items, wherein the predefined number of image feature groups in a seed proposal is 5, such that each seed proposal comprises at least 5 image feature groups.

42. The method according to any of the preceding items, wherein the predefined number of image feature groups in a seed proposal is 10, such that each seed proposal comprises at least 10 image feature groups.

43. The method according to any of the preceding items, wherein the predefined number of image feature groups in a seed proposal is 15, such that each seed proposal comprises at least 15 image feature groups.

44. The method according to any of the preceding items, wherein the predefined number of image feature groups in a seed proposal is 20, such that each seed proposal comprises at least 20 image feature groups.

45. The method according to any of the items 36-43, wherein image feature groups are added to the seed proposal(s) in prioritized order according to their reliability score provided the one or more predefined first criteria are met.

46. The method according to any of the items 36-44, wherein the method further comprises the step of adding one or more image feature groups to a queue prior to adding them to a seed proposal.

47. The method according to item 46, wherein the queue is a priority queue, wherein the reliability score is the priority.

48. The method according to any of the items 46-47, wherein image feature groups are removed from the queue one by one according to the priority/reliability score.

49. The method according to any of the items 46-48, wherein each time an image feature group is removed from the queue, the neighboring image feature groups belonging to the most recently removed group, are evaluated according to one or more predefined criteria.

50. The method according to any of the items 46-49, wherein any one or more of the neighboring image feature groups that meet the predefined criteria are added to the queue.

51. The method according to any of the items 46-50, wherein each time an image feature group is removed from the queue, it is added to a seed proposal.

52. The method according to any of the items 37-44, wherein the one or more predefined first criteria comprise a criterium that the standard deviation of a given image feature group has to be below a predefined threshold in order for the image feature group to be added to a seed proposal.

53. The method according to any of the preceding items, wherein the step of generating seed proposal(s) is repeated iteratively, wherein the predefined criteria are changed at each iteration.

54. The method according to item 53, wherein previously generated seed proposals are allowed to grow in one or more subsequent iterations, wherein said iteration(s) are performed under a different set of criteria than the initial set of criteria.

55. The method according to item 54, wherein the different set of criteria are more relaxed than the initial set of criteria.

56. The method according to any of the preceding items, wherein previously generated seed proposals may be allowed to merge with each other and/or new seed proposal(s) may be allowed to merge with previously generated seed proposal(s).

57. The method according to any of the preceding items, wherein the seed proposal(s) are added (to the digital representation) in prioritized order according to the number of image feature groups in each seed proposal.

58. The method according to any of the preceding items, wherein the method further comprises the step of marking image features of seed proposal(s), which have been added to the digital representation.

59. The method according to any of the preceding items, wherein the one or more predefined second criteria comprise a criterium that the seed proposal should comprise at least a predefined amount of image features, which are not marked, in order for the seed proposal to be added to the digital representation.

60. The method according to any of the preceding items, wherein the method further comprises the step of projecting a predefined pattern onto the 3D object, wherein the pattern comprises a plurality of pattern features, wherein the pattern is projected by one or more projector units each having a projector plane.

61. The method according to item 60, wherein the pattern features are arranged in a regular grid.

62. The method according to item 61, wherein the method comprises the steps of:

dividing the pattern features into one or more group(s) of pattern features for each set of images, wherein each group of pattern features is a connected subset within the regular grid, and determining a solution to the correspondence problem within each group of pattern features.

63. The method according to item 62, wherein each group of pattern features comprises at least 15 pattern features.

64. The method according to any of the preceding items, wherein the method further comprises the step of acquiring two or more images of the 3D object, wherein the images are acquired by two or more cameras.

65. The method according to any of the items 60-64, wherein each pattern feature is associated with a predefined property.

66. The method according to any of the items 60-65, wherein the predefined pattern comprises any of stripes, squares, dots, triangles, rectangles, and/or combinations thereof.

67. The method according to any of the preceding items, wherein the image features are selected from the group of corners, edges, vertices, points, transitions, dots, stripes, and/or combinations thereof.

68. The method according to any of the items 60-67, wherein the image features are selected from the group of corners, edges, vertices, points, transitions, dots, stripes, and/or combinations thereof.

69. The method according to any of the items 60-68, wherein the predefined pattern is a static checkerboard pattern comprising a plurality of checkers.

70. The method according to any of the items 60-69, wherein the image features are corners in the checkerboard pattern.

71. The method according to any of the items 67-70, wherein the pattern features are corners in the checkerboard pattern.

72. The method according to any of the preceding items, wherein each image feature is associated with a predefined property.

73. The method according to any of the preceding items, wherein the predefined property of the image/pattern features is a phase of the pattern, wherein the phase can be either white-black or black-white.

74. The method according to any of the preceding items, wherein each camera has a pre-defined field of view, wherein the cameras are configured such that their field of view at least partially overlap.

75. The method according to any of the items 60-74, wherein each of the cameras has a predefined fixed position relative to the one or more projector units.

76. The method according to any of the preceding items, wherein the step of determining the image features comprises generating a neighborhood graph for each image, wherein each neighborhood graph stores the image feature position of each of the determined image features.

77. The method according to item 76, wherein each neighborhood graph further stores information related to the connectivity of the image features, i.e., which image features are the neighbors of a given image feature.

78. The method according to any of the items 76-77, wherein each neighborhood graph further stores a pre-defined property, such as the phase, of each of the image features.

79. The method according to any of the items 76-78, wherein the neighborhood graph(s) are generated using a neural network.

80. The method according to item 79, wherein the projected pattern is a checkerboard pattern, and wherein the neural network is trained to determine the corners in the checkerboard in the acquired images.

81. The method according to any of the items 79-80, wherein the neural network is trained to classify the checkers of the checkerboard into black and white checkers.

82. The method according to any of the items 79-81, wherein the neural network is executed on a neural processing unit (NPU).

83. The method according to any of the items 79-81, wherein the neural network is executed on a graphics processing unit (GPU).

84. The method according to any of the items 60-82, wherein the method further comprises the step of associating, for each pattern feature, a number of image features, such as zero or more image features, among the determined image features.

85. The method according to item 84, wherein the association of image features to pattern features comprises the steps of:
    projecting, for each image, each of the image features onto the projector plane whereby an epipolar line is obtained for each projected image feature; and
    associating, for each pattern feature, any image features whose corresponding epipolar line passes within a predefined distance to a pattern feature.

86. The method according to any of the items 60-84, wherein the step of determining the depth(s) associated with each image feature comprises the steps of:
    projecting, for each camera, a camera ray for each of the image features in the acquired images, wherein each camera ray is projected in 3D;
    projecting a projector ray for each pattern feature, wherein each projector ray is projected in 3D;
    determining points in 3D, wherein the camera rays associated with image features of different camera index intersect the projector ray within a predefined distance, wherein each of the determined points corresponds to a depth; and
    assigning the depth(s) to each image feature.

87. The method according to any of the preceding items, wherein the pattern is a static pattern, i.e. a pattern that remains fixed in time.

88. The method according to any of the preceding items, wherein one or more steps of the method are performed using a handheld intraoral scanning device.

89. The method according to any of the preceding items, wherein the method comprises the steps of compressing the acquired images and transmitting said images to an external device, such as an external computer.

90. The method according to item 89, wherein the compression is a lossy compression, such as JPEG.

91. The method according to any of the preceding items, wherein the method comprises the step of continuously transmitting compressed images to an external device using a video compression standard such as H.264 or H.265.

92. A processor or computer system comprising means for carrying out the method according to any of the items 1-91.

93. A computer program comprising instructions which, when the program is executed by a processor, cause the processor to carry out the method according to any of the items 1-91.

94. A computer-readable medium having stored thereon the computer program of item 93.

95. A method of generating a digital representation of a three-dimensional (3D) object, the method comprising the steps of:
    projecting a predefined pattern onto the 3D object, wherein the pattern comprises a plurality of pattern features each associated with a predefined property, wherein the pattern is projected by one or more projector units each having a projector plane;
    acquiring two or more images of the 3D object, wherein the images are acquired by a scanning device comprising two or more cameras, wherein each image comprises a plurality of image features, wherein each image feature is associated with a set of image coordinates and a camera index indicating which camera acquired the image associated with the image feature, and wherein each image feature is associated with a predefined property;
    determining the image features in each of the images, wherein the determination includes determining the image coordinates and a camera index of each image feature;
    determining one or more depths associated with each image feature using a triangulation method;
    generating image feature groups, wherein each image feature group comprises one or more image features each having a unique camera index, wherein a depth is assigned to each image feature group;
    generating one or more seed proposals, wherein each seed proposal comprises at least a predefined number of image feature groups, wherein the generation of each seed proposal comprises the steps of:
        adding one or more image feature groups to a seed proposal based on one or more predefined first criteria; and
        accepting seed proposal(s) comprising at least the predefined number of image feature groups; and
    generating a digital representation of the 3D object by adding seed proposal(s) to the digital representation based on one or more predefined second criteria.

96. The method according to item 95, wherein each camera has a pre-defined field of view, wherein the cameras are configured such that their field of view at least partially overlap, wherein each of the cameras has a predefined fixed position relative to the one or more projector units.

97. The method according to any of the items 95-96, wherein the pattern is a static pattern, i.e. a pattern that remains fixed in time.

98. The method according to any of the items 95-97, wherein the pattern features are arranged in a regular grid.

99. The method according to any of the items 95-98, wherein the method comprises the steps of:
dividing the pattern features into one or more group(s) of pattern features for each set of images, wherein each group of pattern features is a connected subset within the regular grid, and
determining a solution to the correspondence problem within each group of pattern features.

100. The method according to item 99, wherein each group of pattern features comprises at least 15 pattern features.

101. A dental scanning system for generating a digital representation of a three-dimensional (3D) object, the scanning system comprising:
a scanning device comprising:
one or more projector units configured for projecting a predefined pattern onto the 3D object, wherein the pattern comprises a plurality of pattern features, wherein each projector unit is associated with a projector plane;
two or more cameras for each projector unit, wherein each camera is configured for acquiring images of at least a part of the object, wherein each of the cameras has a predefined fixed position relative to the one or more projector units; and
one or more processors configured for carrying out the method according to any of the items 1-100.

102. The dental scanning system according to item 101, wherein the predefined pattern is a static pattern.

103. The dental scanning system according to any of the items 101-102, wherein the scanning device comprises at least four cameras for each projector unit.

104. The dental scanning system according to any of the items 101-103, wherein the one or more processors are located on the scanning device.

105. The dental scanning system according to any of the items 101-104, wherein the one or more processors comprise a neural processing unit (NPU) configured to execute the step of determining the image features in each of the images.

106. The dental scanning system according to any of the items 101-104, wherein the one or more processors comprise a field-programmable gate array, a central processing unit (CPU), a neural processing unit (NPU), and/or combinations thereof.

107. The dental scanning system according to any of the items 101-106, wherein the scanning device is a hand-held intraoral scanning device.

108. A dental scanning system for generating a digital representation of a three-dimensional (3D) object, the scanning system comprising:
a scanning device comprising:
one or more projector units configured for projecting a predefined static pattern onto the 3D object, wherein the pattern comprises a plurality of pattern features, wherein each projector unit is associated with a projector plane;

two or more cameras for each projector unit, wherein each camera is configured for acquiring images of at least a part of the object, wherein each of the cameras has a predefined fixed position relative to the one or more projector units, wherein the scanning device is configured for acquiring two or more images of the 3D object; and
a first processor configured to perform the step of:
determining the image features in each of the images;
a second processor configured to perform the steps of:
determining one or more depth(s) associated with each image feature using a triangulation method;
generating image feature groups, wherein each image feature group comprises one or more image features;
generating one or more seed proposals, wherein each seed proposal comprises at least a predefined number of image feature groups, wherein the generation of each seed proposal comprises the steps of:
i. adding one or more image feature groups to a seed proposal based on one or more predefined first criteria;
ii. accepting seed proposal(s) comprising at least the predefined number of image feature groups; and
generating a digital representation of the 3D object by adding seed proposal(s) to the digital representation based on one or more predefined second criteria.

109. The dental scanning system according to item 108, wherein the first processor is a neural processing unit (NPU).

110. The dental scanning system according to any of the items 108-109, wherein the first processor is located on the scanning device.

111. The dental scanning system according to any of the items 108-110, wherein the first processor and the second processor is located on the scanning device.

112. The dental scanning system according to any of the items 108-111, wherein the pattern features are arranged in a regular grid.

113. The dental scanning system according to item 112, wherein the processor(s) are configured to:
divide the pattern features into one or more group(s) of pattern features for each set of images, wherein each group of pattern features is a connected subset within the regular grid, and
determine a solution to the correspondence problem within each group of pattern features.

114. The dental scanning system according to item 113, wherein each group of pattern features comprises at least 15 pattern features.

115. A dental scanning system for generating a digital three-dimensional representation of a dental object, the dental scanning system comprising:
an intraoral scanning device comprising:
one or more projector units configured to project a pattern on a surface of the dental object;
two or more cameras configured to acquire one or more sets of images, wherein each set of images comprises at least one image from each camera, wherein each image includes at least a portion of the projected pattern;

one or more processors configured to:

determine one or more image features within each set of images;

solve a correspondence problem within each set of images such that points in 3D space are determined based on the image features, wherein said points form a solution to the correspondence problem, wherein the correspondence problem is solved for groups of pattern features and/or image features; and generate a digital three-dimensional representation of the dental object, wherein the solution to the correspondence problem is used to generate the three-dimensional representation.

116. The dental scanning system according to item 115, wherein the correspondence problem is solved using a triangulation method.

117. The dental scanning system according to any of the items 115-116, wherein the images within a set of images are acquired simultaneously.

118. The dental scanning system according to any of the items 115-117, wherein the pattern comprises a plurality of pattern features.

119. The dental scanning system according to any of the items 115-118, wherein the one or more processors are located on the scanning device.

120. The dental scanning system according to any of the items 115-119, wherein the scanning device is configured to compress the acquired sets of images and transmit said images to an external device, such as an external computer.

121. The dental scanning system according to any of the items 115-120, wherein the one or more processors comprise a neural processing unit (NPU) configured to perform the step of determining one or more image features within each set of images.

122. The dental scanning system according to any of the items 115-121, wherein the NPU is located on the scanning device.

123. The dental scanning system according to any of the items 115-122, wherein the intraoral scanning device comprises four or more cameras for each projector unit.

124. The dental scanning system according to any of the items 115-123, wherein the one or more processors are configured to carry out the steps of:

determining the one or more image features within each set of images;

solving the correspondence problem within each set of images using a triangulation method; and generating the digital three-dimensional representation of the dental object.

125. The dental scanning system according to any of the items 115-124, wherein the one or more processors include:

a first processor configured to perform the step of determining one or more image features within each set of images;

a second processor configured to perform the steps of:

solving a correspondence problem within each set of images using a triangulation method, such that points in 3D space are determined based on the image features, wherein said points form a solution to the correspondence problem, wherein the correspondence problem is solved for groups of pattern features and/or image features; and generating a digital three-dimensional representation of the dental object, wherein the solution to the correspondence problem is used to generate the three-dimensional representation.

126. The dental scanning system according to any of the items 115-125, wherein the first processor is located on the scanning device, and the second processor is located on an external device.

127. The dental scanning system according to any of the items 115-126, wherein the intraoral scanning device further comprises a wireless module configured to wirelessly transfer data to an external device.

128. The dental scanning system according to any of the items 115-127, wherein the data comprises any of: the determined image features, the sets of images, processed images, fluorescence data, infrared images, the digital three-dimensional representation, and/or combinations thereof.

129. The dental scanning system according to any of the items 101-128, wherein the scanning device is configured to wirelessly transfer the acquired images in a compressed format to an external device.

130. The dental scanning system according to any of the items 101-129, wherein the scanning device is a hand-held intraoral scanning device.

131. The dental scanning system according to any of the items 101-130, wherein the scanning device is configured to compress the acquired images and transmit said images to an external device, such as an external computer.

132. The dental scanning system according to item 131, wherein the compression is a lossy compression, such as JPEG.

133. The dental scanning system according to any of the items 101-132, wherein the scanning device is configured to continuously transmit the compressed images to an external device using a video compression standard such as H.264 or H.265.

134. The dental scanning system according to any of the items 101-133, wherein the scanning device comprises a wireless module configured to wirelessly transfer data, such as images, to the external device.

135. The dental scanning system according to any of the items 101-134, wherein the scanning device is further configured to:

compress the acquired sets of images by applying a lossy image compression; and wirelessly transmit the compressed images and the determined image features to an external device via the wireless module.

Although some embodiments have been described and shown in detail, the disclosure is not restricted to such details, but may also be embodied in other ways within the scope of the subject matter defined in the following claims. In particular, it is to be understood that other embodiments may be utilized, and structural and functional modifications may be made without departing from the scope of the present invention. Furthermore, the skilled person would find it apparent that unless an embodiment is specifically presented only as an alternative, different disclosed embodiments may be combined to achieve a specific implementation and such specific implementation is within the scope of the disclosure.

A claim may refer to any of the preceding claims, and "any" is understood to mean "any one or more" of the preceding claims.

It should be emphasized that the term "comprises/comprising/including" when used in this specification is taken to specify the presence of stated features, integers, operations, steps or components but does not preclude the presence or addition of one or more other features, integers, steps, components or groups thereof.

In claims enumerating several means, several of these means can be embodied by one and the same item of hardware. The mere fact that certain measures are recited in mutually different dependent claims or described in different embodiments does not indicate that a combination of these measures cannot be used to advantage.

The invention claimed is:

1. A dental scanning system for generating a digital three-dimensional representation of a dental object, the dental scanning system comprising:
  an intraoral scanning device comprising:
    one or more projector units configured to project a pattern on a surface of the dental object, wherein the pattern comprises a plurality of pattern features arranged in a regular grid;
    two or more cameras configured to acquire one or more sets of images, wherein each set of images comprises at least one image from each camera, wherein each image includes at least a portion of the projected pattern, wherein the images within a set of images are acquired simultaneously;
  one or more processors configured to:
    determine one or more image features within each set of images;
    solve a correspondence problem within each set of images such that points in 3D space are determined based on the image features, wherein said points form a solution to the correspondence problem, wherein the correspondence problem is solved for groups of pattern features;
    generate a digital three-dimensional representation of the dental object, wherein the solution to the correspondence problem is used to generate the three-dimensional representation
    divide the pattern features into one or more group(s) of pattern features for each set of images, wherein each group of pattern features is a connected subset within the regular grid, wherein each group of pattern features comprises at least 15 pattern features; and
    determine a solution to the correspondence problem within each group of pattern features.

2. The dental scanning system according to claim 1, wherein each group of pattern features forms a connected subset.

3. The dental scanning system according to claim 2, wherein the neural network has been trained using a training dataset, the training dataset comprising digital renderings of dental objects based on existing 3D representations.

4. The dental scanning system according to claim 2, wherein the neural network has been trained using a training dataset, the training dataset comprising pixel level annotations classifying pixels into black and white checkers.

5. The dental scanning system according to claim 2, wherein the neural network has been trained using a training dataset, the training dataset comprising pixel level annotations, said annotations including the location of pattern features.

6. The dental scanning system according to claim 2, wherein the neural network has been trained using a training dataset, the training dataset comprising a pixel level depth map of the corresponding 3D surface of the rendered 2D images.

7. The dental scanning system according to claim 2, wherein the one or more processors comprise a neural processing unit (NPU) configured to execute the neural network, and wherein the NPU is located on the intraoral scanning device.

8. The dental scanning system according to claim 1, wherein the one or more processors are configured to determine the image features using a trained neural network.

9. The dental scanning system according to claim 1, wherein the projected pattern is a checkerboard pattern.

10. The dental scanning system according to claim 9, wherein the checkerboard pattern comprises a plurality of checkers, wherein the corners of the checkers constitute the pattern features.

11. The dental scanning system according to claim 1, wherein the scanning device is configured to compress the acquired images and transmit said images to an external device, such as an external computer.

12. The dental scanning system according to claim 11, wherein the compression is a lossy compression.

13. The dental scanning system according to claim 1, wherein the scanning device is configured to continuously transmit the compressed images to an external device using a video compression standard.

14. The dental scanning system according to claim 1, wherein the scanning device comprises a wireless module configured to wirelessly transfer data, such as images, to the external device.

15. The dental scanning system according to claim 1, wherein the processor(s) comprise a first processor located on the scanning device, the first processor configured to:
  determine the image features within each set of images;
  wherein the processor(s) comprise one or more second processors located external to the scanning device, such as located on a computer system of the dental scanning system, wherein the second processor(s) are configured to:
  solve the correspondence problem within each set of images; and
  generate the digital three-dimensional representation.

16. The dental scanning system according to claim 15, wherein the first processor is a neural processing unit (NPU) or a graphics processing unit (GPU), and wherein the second processor(s) are located on a computer system of the dental scanning system.

17. The dental scanning system according to claim 1, wherein the pattern is a static pattern, i.e. a pattern that remains fixed in time.

18. The dental scanning system according to claim 1, wherein the scanning device comprises four or more cameras for each projector unit.

19. The dental scanning system according to claim 1, wherein the scanning device is configured to transmit the determined image features to an external device, such as a computer system.

20. A computer-implemented method of solving a correspondence problem within a set of images acquired by the dental scanning system according to claim 1, the method comprising the steps of:
  projecting a pattern on a surface of a dental object, wherein the pattern comprises a plurality of pattern features, wherein the pattern is projected by the intraoral scanning device;
  acquiring a set of images comprising at least two images, wherein each of the images within said set of images have been acquired simultaneously from separate cameras, wherein each image includes at least a portion of the projected pattern;

dividing the pattern features into one or more groups of pattern features within the set of images, wherein each group of pattern features forms a connected subset within a regular grid; and determine a solution to the correspondence problem within each group of pattern features within the set of images based on a triangulation.

21. The method according to claim 20, wherein the method includes the step of determining, within the set of images, image features associated with the pattern features, wherein the images features are determined using a trained neural network.

22. A data processing system comprising a processor configured to perform the steps of the method of claim 20.

23. A computer program product comprising instructions which, when the program is executed by a computer, cause the computer to carry out the method of claim 20.

24. A non-transitory computer-readable storage medium comprising instructions which, when executed by a computer, cause the computer to carry out the method of claim 20.

25. A computer-implemented method of training a neural network for determining image features within a set of images acquired by the dental scanning system according to claim 1, the method comprising the steps of:

receiving a training dataset comprising digital renderings of dental objects based on existing 3D representations and one or more desired outputs such as pixel level annotations of the locations of image and/or pattern features;

determining the difference between the output of the neural network and the desired outputs; and adjusting one or more parameters of the neural network to minimize the difference between the output and the desired outputs until a predetermined accuracy is achieved.

\* \* \* \* \*